US012466278B2

(12) United States Patent
Ogihara et al.

(10) Patent No.: US 12,466,278 B2
(45) Date of Patent: Nov. 11, 2025

(54) POWER STORAGE SYSTEM

(71) Applicant: HONDA MOTOR CO., LTD., Tokyo (JP)

(72) Inventors: Yasushi Ogihara, Saitama (JP); Yasuo Yamada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 18/521,438

(22) Filed: Nov. 28, 2023

(65) Prior Publication Data

US 2024/0174099 A1 May 30, 2024

(30) Foreign Application Priority Data

Nov. 30, 2022 (JP) .................................. 2022-192139

(51) Int. Cl.
*H02P 27/08* (2006.01)
*B60L 53/22* (2019.01)
*B60L 58/18* (2019.01)
*H02J 7/00* (2006.01)

(52) U.S. Cl.
CPC .............. *B60L 53/22* (2019.02); *B60L 58/18* (2019.02); *H02J 7/0063* (2013.01); *B60L 2210/10* (2013.01); *H02J 2207/20* (2020.01)

(58) Field of Classification Search
CPC .. B60L 58/18; B60L 2210/10; B60L 2210/14; H02J 2207/20; H02J 2310/48; H02J 7/00; H02J 7/00712; H02P 27/06
See application file for complete search history.

(56) References Cited

U.S. PATENT DOCUMENTS

2022/0239111 A1\* 7/2022 Hafezinasab ........... H02M 7/04
2022/0258633 A1\* 8/2022 Mallik ...................... H02J 7/02

FOREIGN PATENT DOCUMENTS

JP  2019-080474 A  5/2019
JP  2020-150618 A  9/2020

\* cited by examiner

*Primary Examiner* — Muhammad S Islam
(74) *Attorney, Agent, or Firm* — Paratus Law Group, PLLC

(57) ABSTRACT

A power storage system includes a first battery including two power storages, and a switch unit which switches between two voltage states in series and in parallel, a three-phase motor having a neutral point, an inverter connected on a power transmission path between the first battery and the three-phase motor, a DC power supply circuit connected to a connection portion on a power transmission path between the inverter and the first battery, a branch circuit branched from the DC power supply circuit on a positive side thereof and connected to a coil of one phase in the three-phase motor, a capacitor, a pre-charge circuit connected to a power transmission path between the inverter and the first battery, a converter connected to the pre-charge circuit, and a second battery connected to the converter and having a voltage lower than voltages of the first battery in the two voltage states.

10 Claims, 19 Drawing Sheets

FIG. 3
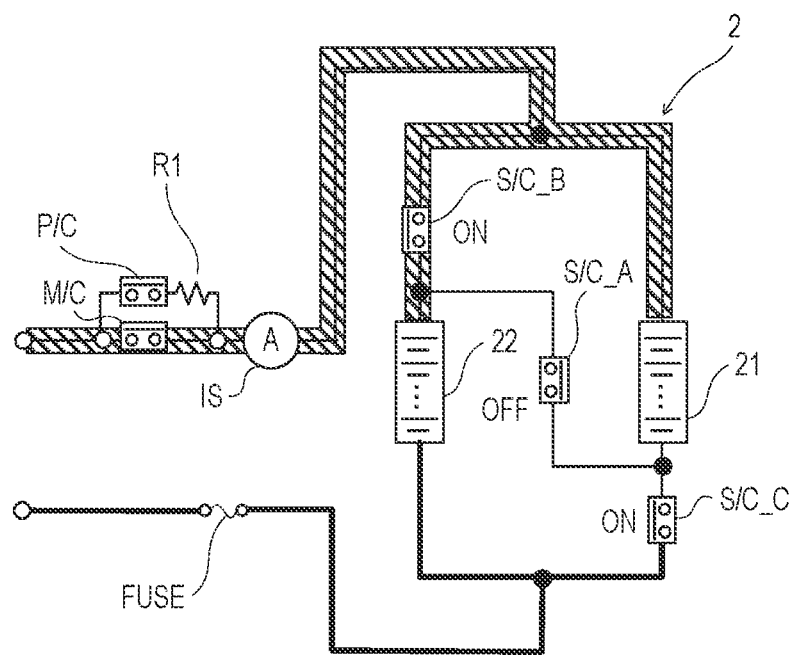
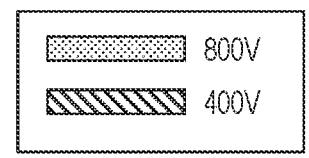

(800 V DRIVE)

(800 V CHARGE)

(400 V CHARGE)

POWER STORAGE SYSTEM

CROSS-REFERENCE TO RELATED APPLICATIONS

This application is based on and claims priority under 35 USC 119 from Japanese Patent Application No. 2022-192139 filed on Nov. 30, 2022, the entire content of which is incorporated herein by reference.

TECHNICAL FIELD

The present disclosure relates to a power storage system.

BACKGROUND ART

In recent years, researches and developments have been conducted on charging and power supply in a vehicle including a secondary battery which contributes to energy efficiency in order to allow more people to have access to affordable, reliable, sustainable and advanced energy.

In relation to charging and power supply in a vehicle including a secondary battery, there are two types of charging equipment such as charge stations which are compatible with 400 V class and 800 V class, respectively. When a vehicle is compatible with only the 400 V class charging equipment, the vehicle cannot enjoy quick charging performance of the 800 V class charging equipment by the 800 V class charging equipment.

In a case where the vehicle is both compatible with the 400 V class charging equipment and the 800 V class charging equipment, generally, a voltage is boosted to 800 V by a voltage converter when charging by the 400 V class charging equipment, or the voltage is stepped down to 400 V by the voltage converter when charging by the 800 V class charging equipment. However, using such a voltage converter for charging deteriorates efficiency during charging.

In this regard, there is known a vehicle which switches a connection system of a battery module so as to be chargeable by both the 400 V class charging equipment and the 800 V class charging equipment without using any voltage converter for charging (for example, see JP2019-080474A and JP2020-150618A).

In the meantime, there are two types of auxiliary devices used in a vehicle, one is driven at 400 V class and the other one is driven at 800 V class. In the vehicle in which the connection system of the battery module is switched, voltage conversion is generally performed by a voltage converter for an auxiliary device, for example, when a 400 V class auxiliary device is driven during charging by the 800 V class charging equipment, or when an 800 V class auxiliary device is driven during charging by the 400 V class charging equipment. However, such a voltage converter for an auxiliary device is expensive and thus a manufacturing cost increases.

SUMMARY OF INVENTION

The present disclosure provides a power storage system capable of being efficiently charged according to a voltage state of charging equipment while reducing a manufacturing cost.

An aspect of the present disclosure relates to a power storage system, including:

a first battery including a first power storage, a second power storage, and a first switch unit configured to switch between a first voltage state in which the first power storage and the second power storage are connected in series and chargeable at a first voltage, and a second voltage state in which the first power storage and the second power storage are connected in parallel and chargeable at a second voltage;

a three-phase motor including coils of three phases connected at a neutral point, the three-phase motor being configured to be driven by electric power supplied from the first battery;

an inverter connected on an electric power transmission path between the first battery and the three-phase motor;

a DC power supply circuit connected to a first connection portion positioned on an electric power transmission path between the inverter and the first battery;

a branch circuit branched from the DC power supply circuit on a positive electrode side of the DC power supply circuit, and connected to a coil of any one phase among the coils of three phases;

a capacitor having one end and an other end, the one end being connected to an electric power supply circuit, which connects the inverter and the first battery, at a negative electrode side, and the other end being connected to the branch circuit or the electric power supply circuit at a positive electrode side;

a pre-charge circuit connected, between the inverter and the first connection portion of the DC power supply circuit, to an electric power transmission path between the inverter and the first battery;

a converter connected to the pre-charge circuit; and a second battery connected to the converter and having a voltage lower than the first voltage and the second voltage.

According to the present disclosure, the power storage system can be efficiently charged according to a voltage state of charging equipment while reducing a manufacturing cost.

BRIEF DESCRIPTION OF DRAWINGS

Exemplary embodiment(s) of the present invention will be described in detail based on the following figures, wherein:

FIG. 3 is a diagram showing a second voltage state (400 V start-up) of the first battery 2;

DESCRIPTION OF EMBODIMENTS

Hereinafter, embodiments of the present disclosure will be described with reference to the drawings. First, a first embodiment of the present disclosure will be described with reference to FIGS. 1 to 9.

First Embodiment

Figure 1:
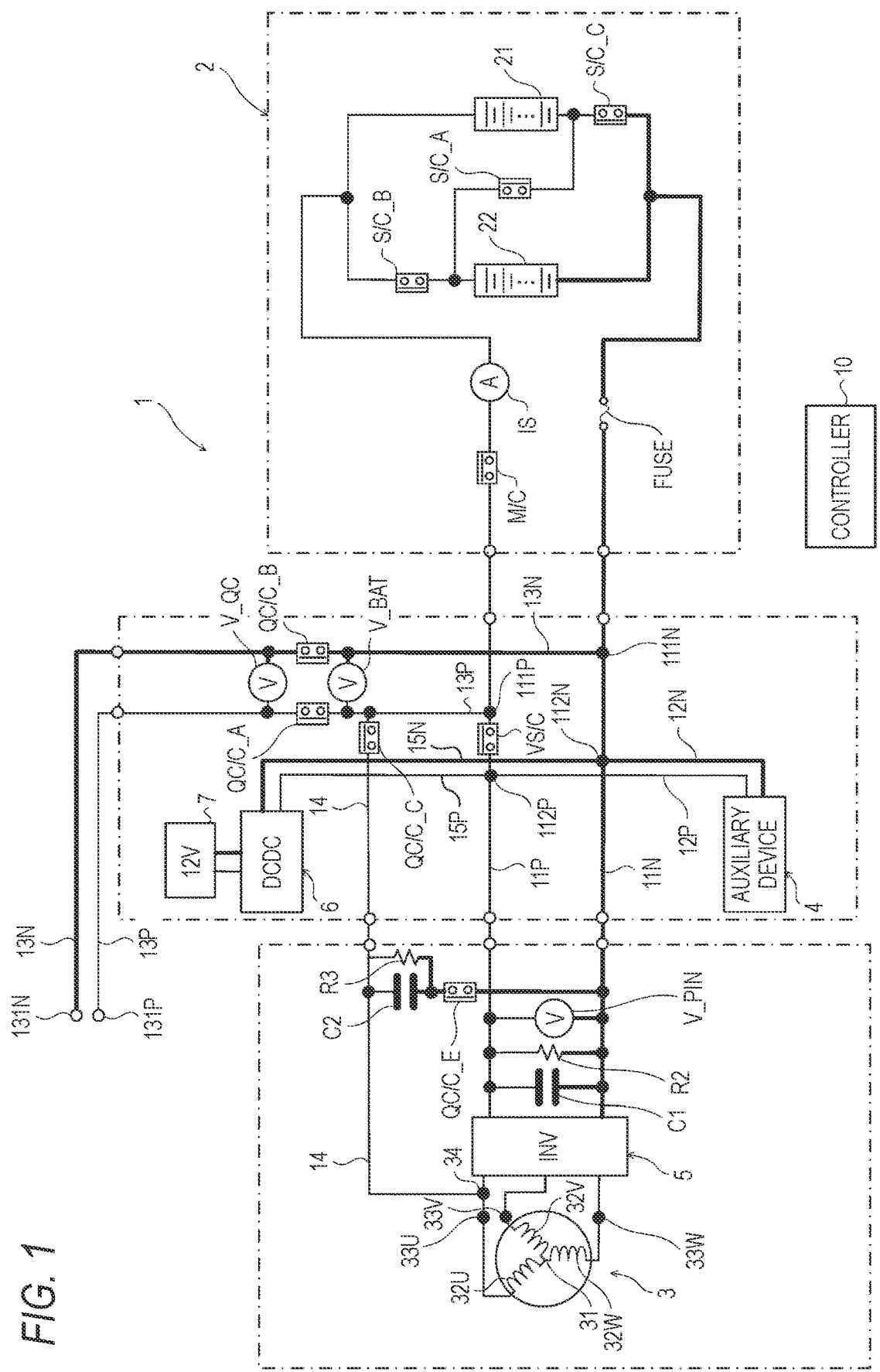
FIG. 1 is a diagram showing a configuration of a power storage system 1 according to a first embodiment.

A power storage system 1 according to a first embodiment shown in FIG. 1 is mounted on an electric vehicle such as an electric automobile. The electric vehicle including the power storage system 1 is compatible with charging equipment of 400 V class and 800 V class. The electric vehicle can not only quickly charge a first battery 2 at charge voltages of 400 V and 800 V but also efficiently drive a three-phase motor 3 and an auxiliary device 4 at a base voltage of 800 V.

Specifically, as shown in FIG. 1, the power storage system 1 includes the first battery 2, the three-phase motor 3, the auxiliary device 4, an inverter 5 (PDU), a DC-DC converter 6, a second battery 7, a first smoothing capacitor C1, a second smoothing capacitor C2, converter circuits 15P and 15N, electric power supply circuits 11P and 11N, auxiliary device drive circuits 12P and 12N. DC power supply circuits 13P and 13N, a branch circuit 14, and a controller 10.

Figure 2:
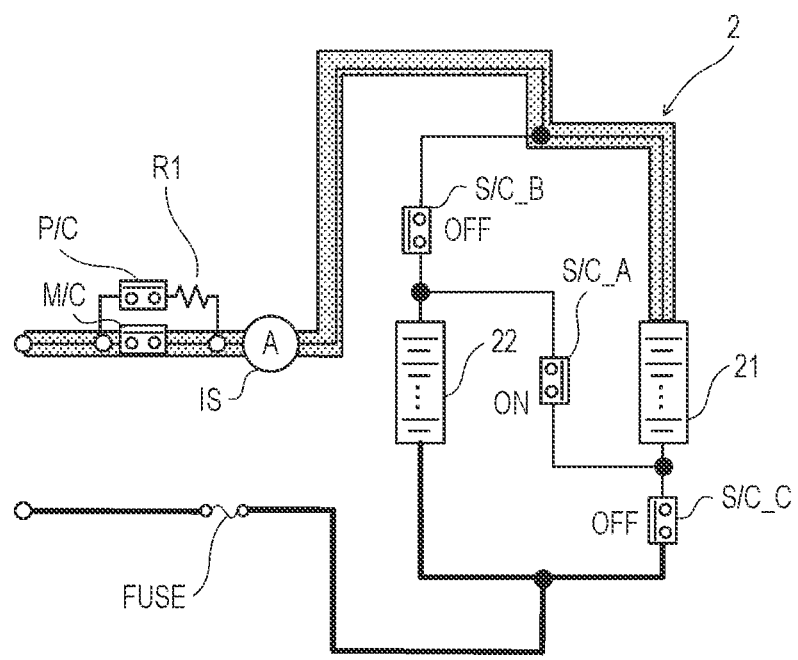
FIG. 2 is a diagram showing a first voltage state (800 V start-up) of a first battery 2.

As shown in FIGS. 1 to 3, the first battery 2 includes a first power storage 21, a second power storage 22, first to fourth contactors M/C, S/C_A, S/C_B, S/C_C, a current sensor IS, and a current breaker FUSE.

The first power storage 21 and the second power storage 22 are battery modules which can perform charging and discharging of 400 V.

The first contactor M/C is provided on a positive end portion of the first battery 2 and functions as a main switch which turns on and off connection to the outside (the electric power supply circuit 11P) of the first battery 2.

The second to fourth contactors S/C_A, S/C_B, and S/C_C switch a connection state between the first power storage 21 and the second power storage 22. For example, as shown in FIG. 2, when the second contactor S/C_A is turned on whereas the third contactor S/C_B and the fourth contactor S/C_C are turned off, the first battery 2 is in a first voltage state (800 V start-up) in which the first power storage 21 and the second power storage 22 are connected in series, so that the first battery 2 can perform charging and discharging at 800 V. As shown in FIG. 3, when the second contactor S/C_A is turned off whereas the third contactor S/C_B and the fourth contactor S/C_C are turned on, the first battery 2 is in a second voltage state (400 V start-up) in which the first power storage 21 and the second power storage 22 are connected in parallel, so that the first battery 2 can perform charging and discharging at 400 V. Note that the term start-up refers to a concept including driving during traveling of an electric vehicle including the power storage system 1 and charging during parking of the electric vehicle. The second to fourth contactors S/C_A, S/C_B, and S/C_C constitute an example of a first switch unit configured to switch between the first voltage state (800 V start-up) and the second voltage state (400 V start-up).

The current sensor IS is provided between the first contactor M/C and the power storages 21 and 22 to measure a current.

The current breaker FUSE is provided on a negative end portion of the first battery 2 and cuts off the connection to the outside (the electric power supply circuit 11N) of the first battery 2 when an abnormality occurs. In the power storage system 1 according to the present embodiment, the current breaker FUSE is implemented by a pyro-fuse which can intentionally cut off a current according to an electrical signal. When an abnormality occurs (for example, vehicle collision or a short circuit in the first battery 2), the current breaker FUSE performs a cut-off operation, and all the contactors in the first battery 2 are turned off (opened). Accordingly, when an abnormality occurs, the connection to the outside can be cut off on both the positive and negative end sides of the first battery 2, and additionally, in both the first voltage state (800 V start-up) and the second voltage state (400 V start-up), reliable circuit cut-off can be performed by turning off the plurality of contactors on the circuit even when contactor welding occurs. Since a pyro-fuse is used as the current breaker FUSE, it is not necessary to provide a contactor on the negative end portion of the first battery 2, and thus the number of components and a cost can be reduced.

The three-phase motor 3 includes coils 32U, 32V, and 32W of three phases, one end side of each of which is connected to a neutral point 31, and is rotationally driven by electric power supplied from the first battery 2 via the inverter 5. The three-phase motor 3 in the present embodiment includes a U-phase terminal 33U, a V-phase terminal 33V, and a W-phase terminal 33W connected to the other end side of each of the coils 32U, 32V, and 32W, respectively. The U-phase terminal 33U, the V-phase terminal 33V, and the W-phase terminal 33W are connected to the inverter 5. The other end side of any one of the coils 32U, 32V, 32W is connected to the branch circuit 14 at a connection terminal 34. In the present embodiment, the coil 32U among the coils 32U, 32V, and 32W of three phases is connected to the branch circuit 14 at the connection terminal 34 positioned between the U-phase terminal 33U and the inverter 5.

The inverter 5 converts DC electric power supplied from the first battery 2 into three-phase AC electric power by switching a plurality of switching elements, so as to rotationally drive the three-phase motor 3. When a DC (400 V) is supplied from the branch circuit 14 to the connection terminal 34, the inverter 5 can function as a booster circuit by switching the plurality of switching elements to boost the DC (to 800 V) using the coil connected to the branch circuit 14 and the coil of another phase (in the present embodiment, the coils 32U and 32V or the coils 32U and 32W). That is, the coils 32U, 32V, and 32W wound around a stator core are used as transformers. The inverter 5 allows a current to flow from the three-phase motor 3 side to the first battery 2 side regardless of on and off of a gate, and allows a current to flow from the first battery 2 side to the three-phase motor 3 side only when the gate is on.

The auxiliary device 4 is a high-voltage driven in-vehicle device which can be driven by DC electric power from the first battery 2 and an external power supply, and examples thereof includes an electric compressor or a heater for air-conditioning. The auxiliary device 4 is connected to the first battery 2 via the auxiliary device drive circuits 12P and 12N, a seventh contactor VS/C, and the electric power supply circuits 11P and 11N, which will be described later. The seventh contactor VS/C is an example of a third switch unit. The auxiliary device 4 according to the present embodiment is operated at the base voltage of 800 V.

The DC-DC converter 6 is a bidirectional DC-DC converter which can step down electric power input from one side and can boost electric power input from the other side. The DC-DC converter 6 includes one side connected with the electric power supply circuits 11P and 11N via the converter circuits 15P and 15N and the other side connected with the second battery 7 having a voltage (for example, 12V) lower than that of the first battery 2. The DC-DC converter 6 steps down DC electric power from the first battery 2 or the external power supply to charge the second battery 7. The DC-DC converter 6 boosts DC electric power from the second battery 7 to a first voltage (800 V) to pre-charge the first smoothing capacitor C1 and the second smoothing capacitor C2 when the electric vehicle starts traveling or 800 V charging is started. The DC-DC converter 6 boosts the DC electric power from the second battery 7 to a second voltage (400 V) to pre-charge the first smoothing capacitor C1 and the second smoothing capacitor C2 when 400 V charging is started. Note that the DC-DC converter 6 is provided with an ammeter (not shown). The second battery 7 is connected with a low-voltage driven in-vehicle device (not shown).

The electric power supply circuits 11P and 11N are configured as a positive and negative pair and connect the first battery 2 and the inverter 5 (three-phase motor 3). The electric power supply circuits 11P and 11N are provided with connection portions 111P and 111N connected to the DC power supply circuits 13P and 13N and are provided with connection portions 112P and 112N connected to the auxiliary device drive circuits 12P and 12N (auxiliary device 4) and the converter circuits 15P and 15N (DC-DC converter 6) on a side closer to the inverter 5 than the connection portions 111P and 111N. The electric power supply circuit 11P on the positive electrode side is provided with the seventh contactor VS/C which turns on and off the circuit between the connection portion 112P connected to the auxiliary device drive circuit 12P and the converter circuit 15, and the connection portion 111P connected to the DC power supply circuit 13P.

A first voltage sensor V_PIN, the first smoothing capacitor C1 and a second resistor R2 are provided on the inverter 5 side of the electric power supply circuits 11P and 11N. The first voltage sensor V_PIN, the first smoothing capacitor C1, and the second resistor R2 are provided on a circuit that connects the electric power supply circuit 11P at the positive electrode side and the electric power supply circuit 11N at the negative electrode side. Note that the second resistor R2 is provided to discharge the first smoothing capacitor C1 when the circuit is cut off.

On a circuit connecting the electric power supply circuit 11N on the negative electrode side and the branch circuit 14, an eleventh contactor QC/C_E for turning on and off this circuit and a second smoothing capacitor C2 are provided in series. On a circuit parallel to the second smoothing capacitor C2, a third resistor R3 is provided for discharging the second smoothing capacitor C2 when the circuit is cut off.

The DC power supply circuits 13P and 13N are configured as a positive and negative pair and include one end provided with charge terminals 131P and 131N to which an external power supply such as charging equipment can be connected and the other end connected to the electric power supply circuits 11P and 11N via the connection portions 111P and 111N. The DC power supply circuits 13P and 13N are provided with an eighth contactor QC/C_A and a ninth contactor QC/C_B for turning on and off the circuits, respectively. A second voltage sensor V_BAT is provided at a position closer to the connection portions 111P and 111N than the eighth contactor QC/C_A and the ninth contactor QC/C_B. A third voltage sensor V_QC is provided at a position closer to the charge terminals 131P and 131N than the eighth contactor QC/C_A and the ninth contactor QC/C_B.

The branch circuit 14 is branched, in the DC power supply circuit 13P at the positive electrode side, at a position closer to the connection portion 111P than the eighth contactor Q/C_A and the second voltage sensor V_BAT and is connected to one of the coils of the three-phase motor 3 via the connection terminal 34. An intermediate portion of the branch circuit 14 is provided with a tenth contactor QC/C_C for turning on and off the circuit. The tenth contactor QC/C_C is an example of a second switch unit.

The controller 10 is, for example, a vehicle ECU and controls driving and charging of the power storage system 1. More specifically, the controller 10 performs on and off control of the contactors M/C, S/C_A, S/C_B, S/C_C, VS/C, QC/C_A, QC/C_B, QC/C_C, and QC/C_E, detection of welding of these contactors, and control of the DC-DC converter 6 and the inverter 5.

Next, an operation of the power storage system 1 will be described with reference to FIGS. 4 to 9.

Figure 4:
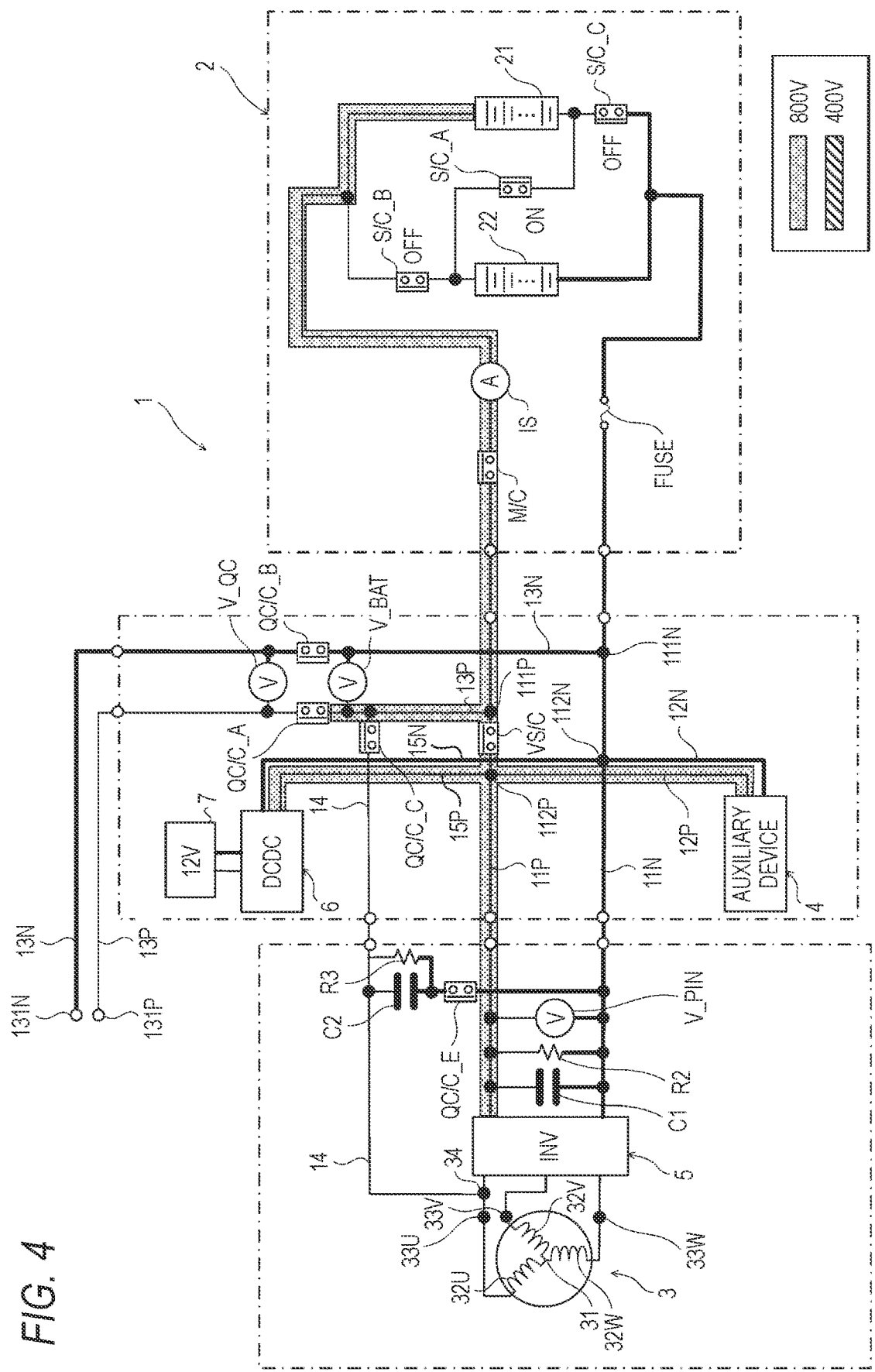
FIG. 4 is a diagram showing a flow of a current during traveling of an electric vehicle including the power storage system 1 according to the first embodiment.
Figure 7:
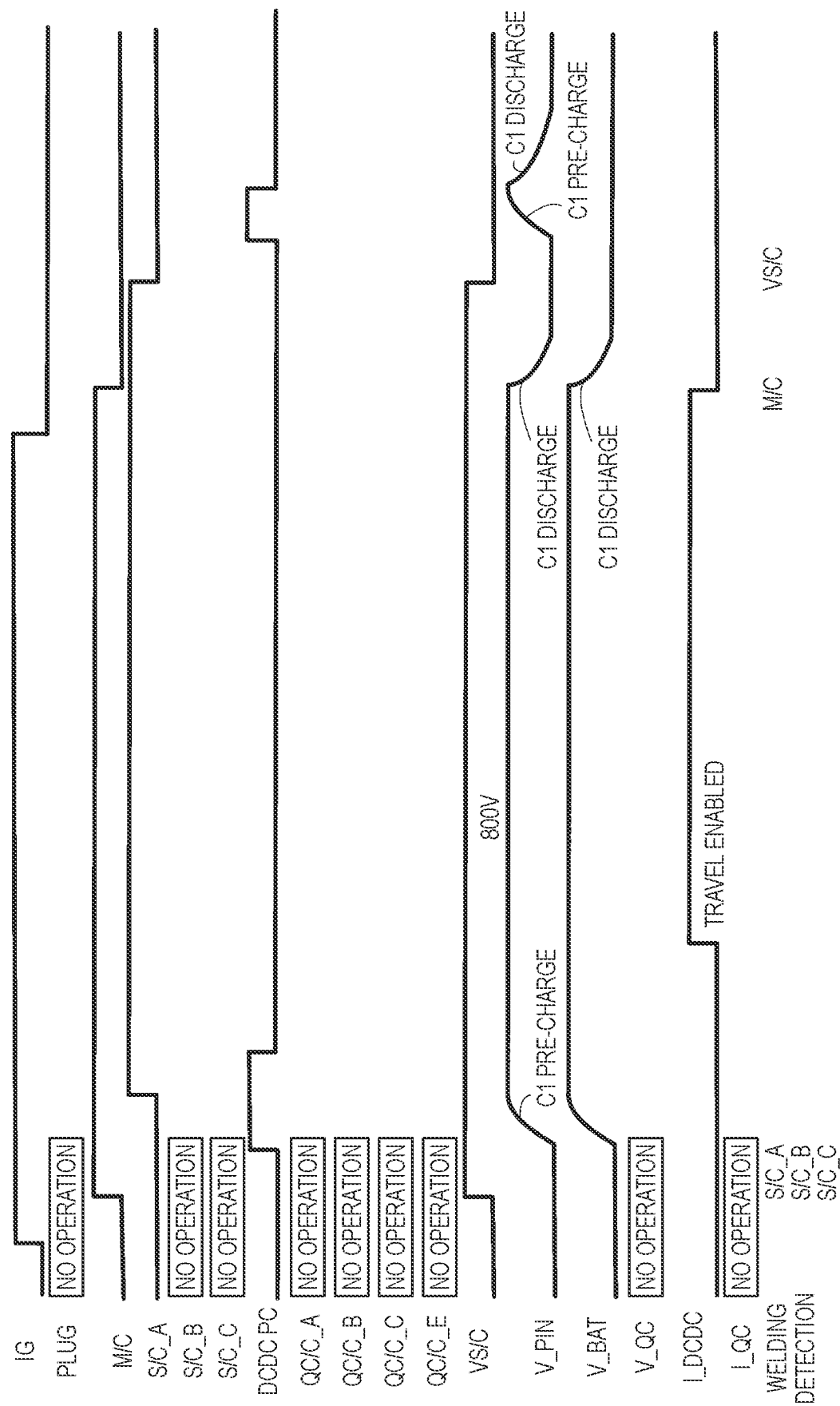
FIG. 7 is a diagram showing an operation sequence during traveling of the electric vehicle including the power storage system 1 according to the first embodiment.

FIG. 4 is a diagram showing a flow of a current during traveling (800 V drive) of the electric vehicle including the power storage system 1 according to the first embodiment, and FIG. 7 is a diagram showing an operation sequence during traveling (800 V drive) of the electric vehicle including the power storage system 1 according to the first embodiment.

When an ignition switch IG of the electric vehicle is turned on, the controller 10 first turns on the first contactor M/C and the seventh contactor VS/C and checks detected voltage values of the first voltage sensor V_PIN and the second voltage sensor V_BAT. When the detected voltage values of the first voltage sensor V_PIN and the second voltage sensor V_BAT increase, the controller 10 determines that any one of the second to fourth contactors S/C_A, S/C_B, and S/C_C is welded and performs abnormality notification.

When the controller 10 determines that the second to fourth contactors S/C_A, S/C_B, and S/C_C are not welded, the controller 10 boosts electric power of the second battery 7 to the first voltage (800 V) by a boost operation of the DC-DC converter 6 and pre-charges the first smoothing capacitor C1. When pre-charging of the first smoothing capacitor C1 is completed, the controller 10 turns on the second contactor S/C_A, connects the circuit in the first battery 2 to the first voltage state (800 V start-up), and afterward stops the boost operation of the DC-DC converter 6. Accordingly, travel of the electric vehicle is enabled. In this case, the auxiliary device 4 is connected to the electric power supply circuits 11P and 11N via the auxiliary device drive circuits 12P and 12N and is driven by the first voltage (800 V) supplied from the first battery 2.

On the other hand, when the ignition switch IG is turned off, the controller 10 first turns off the first contactor M/C and checks the detected voltage values of the first voltage sensor V_PIN and the second voltage sensor V_BAT. When the detected voltage values of the first voltage sensor V_PIN and the second voltage sensor V_BAT do not decrease due to the discharging of the first smoothing capacitor C1, the controller 10 determines that the first contactor M/C is welded, and performs abnormality notification.

When the controller 10 determines that the first contactor M/C is not welded, the controller 10 turns off the second contactor S/C_A and the seventh contactor VS/C after discharging of the first smoothing capacitor C1 is completed. Thereafter, the controller 10 further boosts the electric power of the second battery 7 to the first voltage (800 V) by the boost operation of the DC-DC converter 6, charges the first smoothing capacitor C1 again and checks the detected voltage value of the second voltage sensor V_BAT. When the detected voltage value of the second voltage sensor V_BAT increases, the controller 10 determines that the seventh contactor VS/C is welded and performs abnormality notification.

When the controller 10 determines that the seventh contactor VS/C is not welded, the controller 10 stops the boost operation of the DC-DC converter 6 and ends the operation sequence during traveling.

Figure 5:
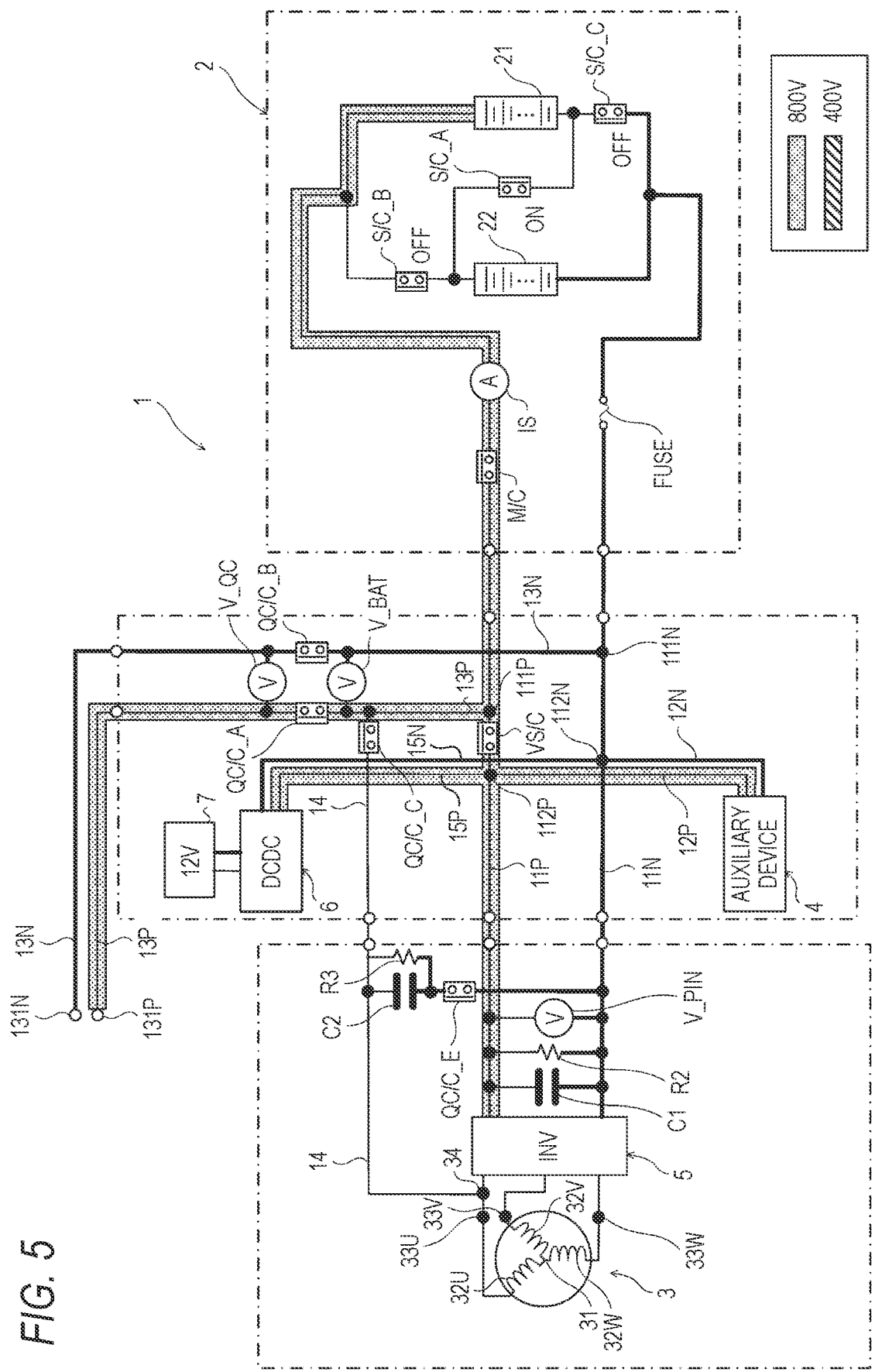
FIG. 5 is a diagram showing a flow of a current during charging at a first voltage (800 V) of the electric vehicle including the power storage system 1 according to the first embodiment.
Figure 8:
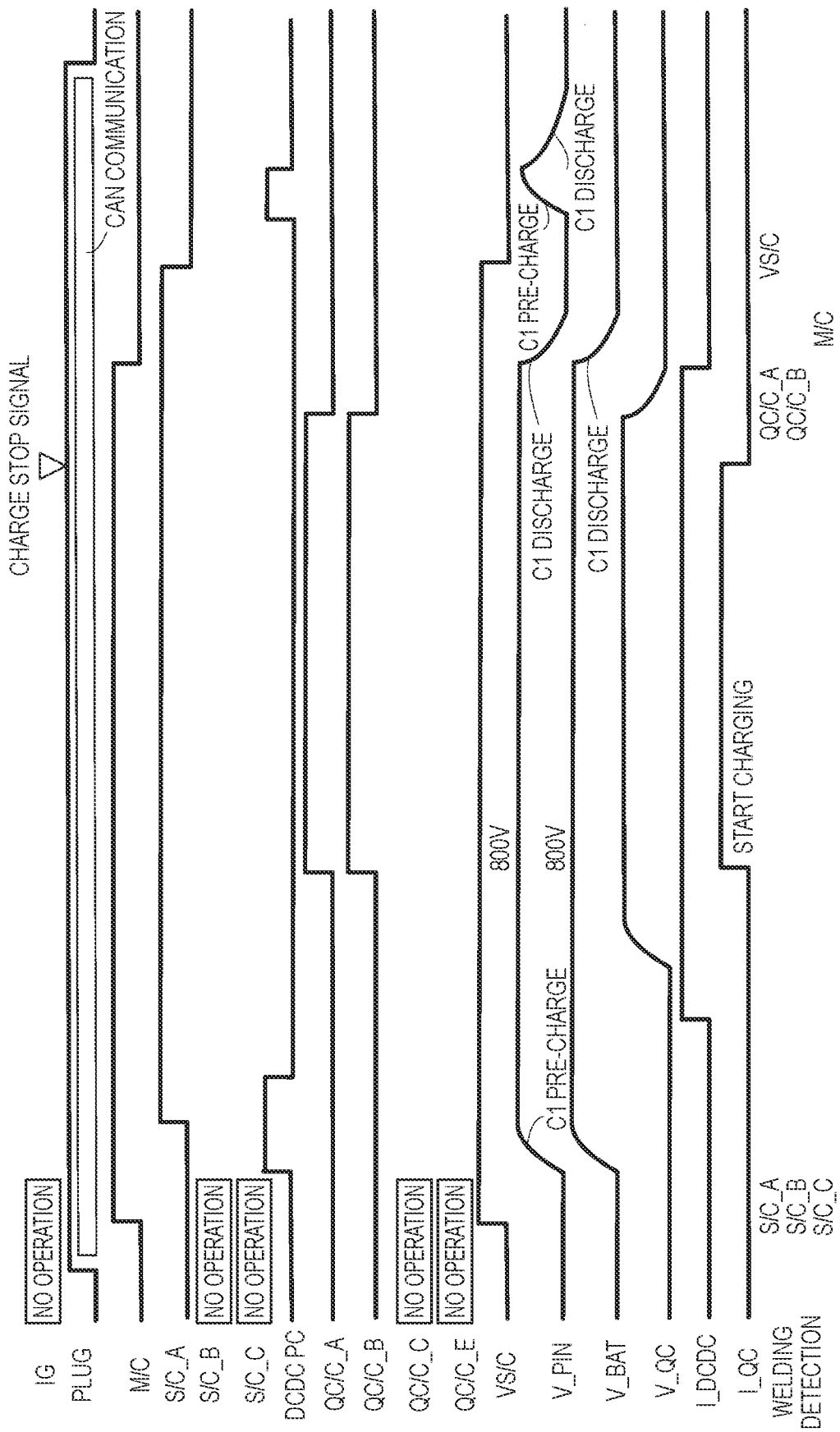
FIG. 8 is a diagram showing an operation sequence during charging at the first voltage (800 V) of the electric vehicle including the power storage system 1 according to the first embodiment.

FIG. 5 is diagram showing a flow of a current during charging at the first voltage (800 V charge) of the electric vehicle including the power storage system 1 according to the first embodiment, and FIG. 8 is a diagram showing an operation sequence during charging at the first voltage (800 V charge) of the electric vehicle including the power storage system 1 according to the first embodiment.

When a charge plug is connected to the charge terminals 131P and 131N, the controller 10 performs CAN communication with charging equipment to recognize a charge voltage. When the charge voltage is the first voltage (800 V), the controller 10 first turns on the first contactor M/C and the seventh contactor VS/C and checks the detected voltage values of the first voltage sensor V_PIN and the second voltage sensor V_BAT. When the detected voltage values of the first voltage sensor V_PIN and the second voltage sensor V_BAT increase, the controller 10 determines that any one of the second to fourth contactors S/C_A, S/C_B, and S/C_C is welded and performs abnormality notification.

When the controller 10 determines that the second to fourth contactors S/C_A, S/C_B, and S/C_C are not welded, the controller 10 boosts electric power of the second battery 7 to the first voltage (800 V) by a boost operation of the DC-DC converter 6 and pre-charges the first smoothing capacitor C1. When pre-charging of the first smoothing capacitor C1 is completed, the controller 10 turns on the second contactor S/C_A, connects the circuit in the first battery 2 to the first voltage state (800 V), and afterward stops the boost operation of the DC-DC converter 6. Accordingly, the first battery 2 is in a state in which charging at the first voltage (800 V) can be started.

Thereafter, the controller 10 turns on the eighth contactor QC/C_A and the ninth contactor QC/C_B to start charging the first battery 2 at the first voltage (800 V). In this case, the auxiliary device 4 is connected to the DC power supply circuits 13P and 13N via the auxiliary device drive circuits 12P and 12N and the seventh contactor VS/C and is driven by the first voltage (800 V) supplied from the charging equipment.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 turns off the first contactor M/C and checks the detected voltage values of the first voltage sensor V_PIN and the second voltage sensor V_BAT. When the detected voltage values of the first voltage sensor V_PIN and the second voltage sensor V_BAT do not decrease due to the discharging of the first smoothing capacitor C1, the controller 10 determines that the first contactor M/C is welded, and performs abnormality notification.

When the controller 10 determines that the first contactor M/C is not welded, the controller 10 turns off the second contactor S/C_A and the seventh contactor VS/C after discharging of the first smoothing capacitor C1 is completed. Thereafter, the controller 10 further boosts the electric power of the second battery 7 to the first voltage (800 V) by the boost operation of the DC-DC converter 6, charges the first smoothing capacitor C1 again and checks the detected voltage value of the second voltage sensor V_BAT. When the detected voltage value of the second voltage sensor V_BAT increases, the controller 10 determines that the seventh contactor VS/C is welded and performs abnormality notification.

When the controller 10 determines that the seventh contactor VS/C is not welded, the controller 10 stops the boost operation of the DC-DC converter 6 and ends the operation sequence during charging at the first voltage (800 V).

Figure 6:
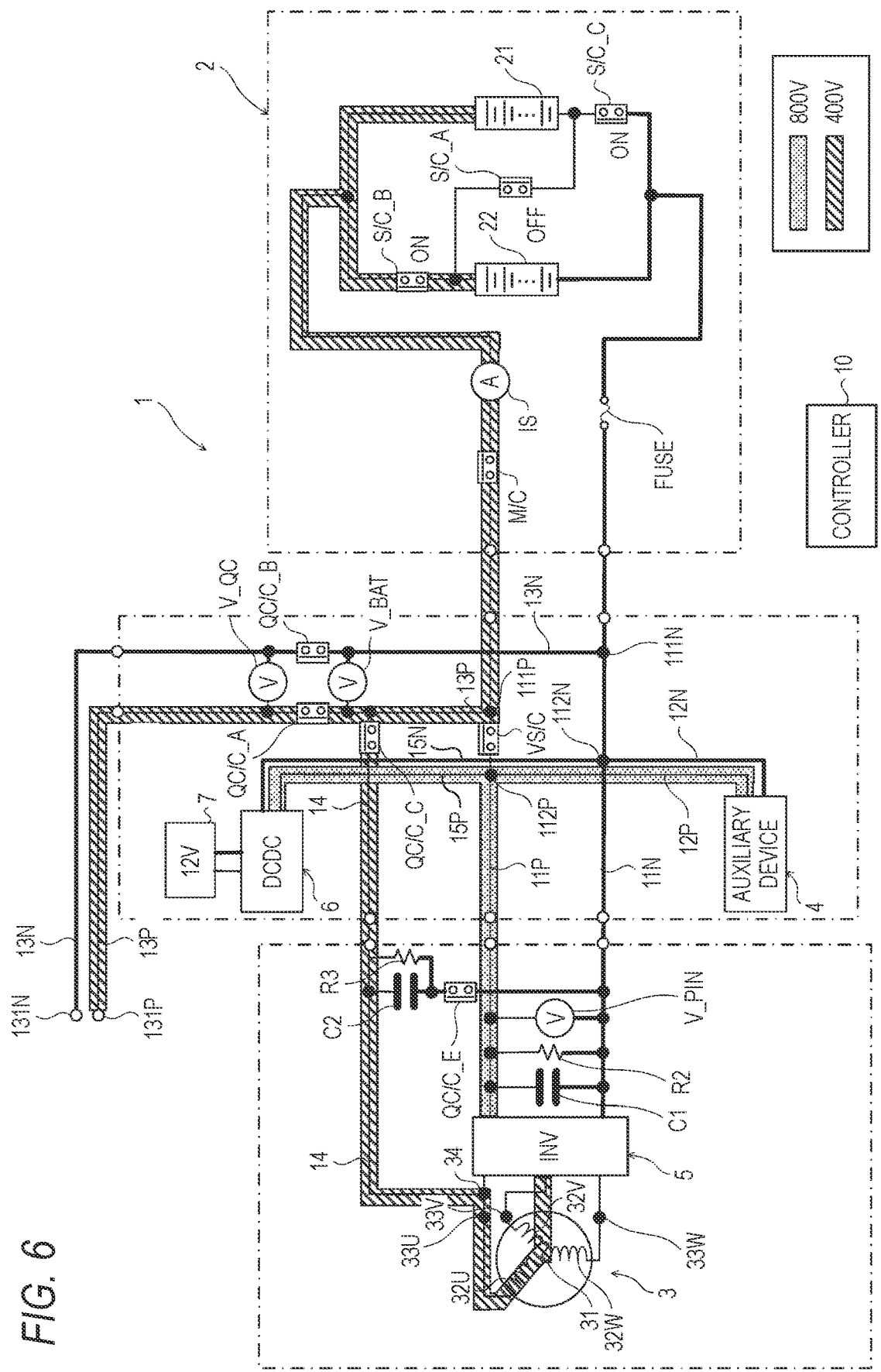
FIG. 6 is a diagram showing a flow of a current during charging at a second voltage (400 V) of the electric vehicle including the power storage system 1 according to the first embodiment.
Figure 9:
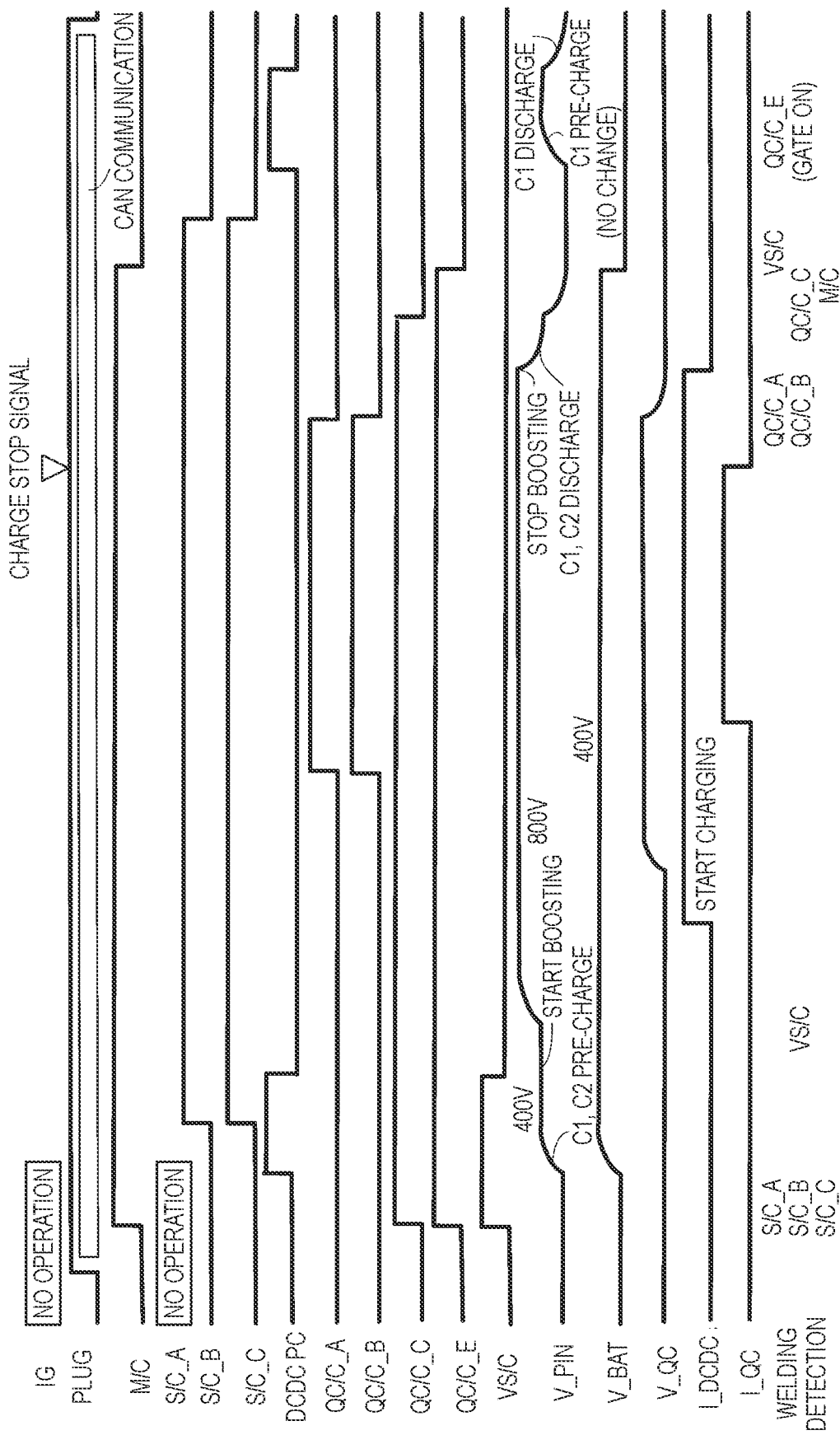
FIG. 9 is a diagram showing an operation sequence during charging at the second voltage (400 V) of the electric vehicle including the power storage system 1 according to the first embodiment.

FIG. 6 is a diagram showing a flow of a current during charging at the second voltage (400 V charge) of the electric vehicle including the power storage system 1 according to the first embodiment, and FIG. 9 is a diagram showing an operation sequence during charging at the second voltage (400 V charge) of the electric vehicle including the power storage system 1 according to the first embodiment.

When a charge plug is connected to the charge terminals 131P and 131N, the controller 10 performs CAN communication with charging equipment to recognize a charge voltage. When the charge voltage is the second voltage (400 V), the controller 10 first turns on the first contactor M/C, the seventh contactor VS/C, the tenth contactor QC/C_C and the eleventh contactor QC/C_E, and checks the detected voltage values of the first voltage sensor V_PIN and the second voltage sensor V_BAT. When the detected voltage values of the first voltage sensor V_PIN and the second voltage sensor V_BAT increase, the controller 10 determines that any one of the second to fourth contactors S/C_A, S/C_B, and S/C_C is welded and performs abnormality notification.

When the controller 10 determines that the second to fourth contactors S/C_A, S/C_B, and S/C_C are not welded, the controller 10 boosts the electric power of the second battery 7 to the second voltage (400 V) by the boost operation of the DC-DC converter 6 and pre-charges the first smoothing capacitor C1 and the second smoothing capacitor C2. When pre-charging of the first smoothing capacitor C1 and the second smoothing capacitor C2 is completed, the controller 10 turns on the third contactor S/C_B and the fourth contactor S/C_C, connects the circuit in the first battery 2 in the second voltage state (400 V), afterward stops the boost operation of the DC-DC converter 6 and turns off the seventh contactor VS/C. After turning off the seventh contactor VS/C, the controller 10 starts a boost operation performed by the three-phase motor 3 and the inverter 5 and checks the detected voltage value of the first voltage sensor V_PIN. When the detected voltage value of the first voltage sensor V_PIN does not increase, the controller 10 determines that the seventh contactor VS/C is welded and performs abnormality notification. Here, if no abnormality occurs, the first battery 2 is in a state in which charging at the second voltage (400 V) can be started.

Thereafter, the controller 10 turns on the eighth contactor QC/C_A and the ninth contactor QC/C_B to start charging the first battery 2 at the second voltage (400 V). In this case, the three-phase motor 3 and the inverter 5 connected to the DC power supply circuits 13P and 13N via the branch circuit 14 boost the second voltage (400 V) supplied from the charging equipment to the first voltage (800 V) to drive the auxiliary device 4.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 stops the boosting performed by the three-phase motor 3 and the inverter 5, then turns off the tenth contactor QC/C_C and checks the detected voltage value of the first voltage sensor V_PIN. When the detected voltage value of the first voltage sensor V_PIN does not decrease due to discharging of the first and second smoothing capacitors C1 and C2, the controller 10 determines that the tenth contactor QC/C_C is welded, and performs abnormality notification.

When the controller 10 determines that the tenth contactor QC/C_C is not welded, the controller 10 turns off the first contactor M/C and the eleventh contactor QC/C_E and checks the voltage value of the second voltage sensor V_BAT after discharging of the first and second smoothing capacitors C1 and C2 is completed. When the voltage value of the second voltage sensor V_BAT does not decrease due to voltage cutoff with the first battery 2, the controller 10 determines that the first contactor M/C is welded, and performs abnormality notification.

When the controller 10 determines that the first contactor M/C is not welded, after turning off the third contactor S/C_B and the fourth contactor S/C_C, the controller 10 boosts the electric power of the second battery 7 to the second voltage (400 V) by a boost operation of the DC-DC converter 6, charges the first smoothing capacitor C1 again, and checks the detected voltage value of the second voltage sensor V_BAT. When the detected voltage value of the second voltage sensor V_BAT increases, the controller 10 determines that the seventh contactor VS/C is welded and performs abnormality notification.

When the controller 10 determines that the seventh contactor VS/C is not welded, the controller 10 turns on a gate of the inverter 5 and checks the detected voltage value of the first voltage sensor V_PIN. When the detected voltage value of the first voltage sensor V_PIN decreases, the controller 10 determines that the eleventh contactor QC/C_E is welded, and performs abnormality notification.

When the controller 10 determines that the eleventh contactor QC/C_E is not welded, the controller 10 stops the boost operation of the DC-DC converter 6 and ends the operation sequence during charging at the second voltage (400 V).

Accordingly, regardless of whether the charge voltage is the first voltage (800 V) or the second voltage (400 V), it is possible to boost the electric power of the second battery 7 by the DC-DC converter 6 to pre-charge the first smoothing capacitor C1 and the second smoothing capacitor C2, thereby pre-charging the first smoothing capacitor C1 and the second smoothing capacitor C2 by using the DC-DC converter 6 which steps down the electric power of the first battery 2 and supplies the electric power to the second battery 7.

As described above, by changing the boost voltage when the first smoothing capacitor C1 and the second smoothing capacitor C2 are pre-charged between the case where the charge voltage is the first voltage (800 V) and the case where the charge voltage is the second voltage (400 V), it is possible to appropriately pre-charge the first smoothing capacitor C1 and the second smoothing capacitor C2 according to the charge voltage.

Second Embodiment

Next, the power storage system 1 according to the second embodiment will be described with reference to FIGS. 10 to 16. Here, the same reference numerals as in the first embodiment are used for the same configurations as in the first embodiment, and the description of the first embodiment may be incorporated.

Figure 10:
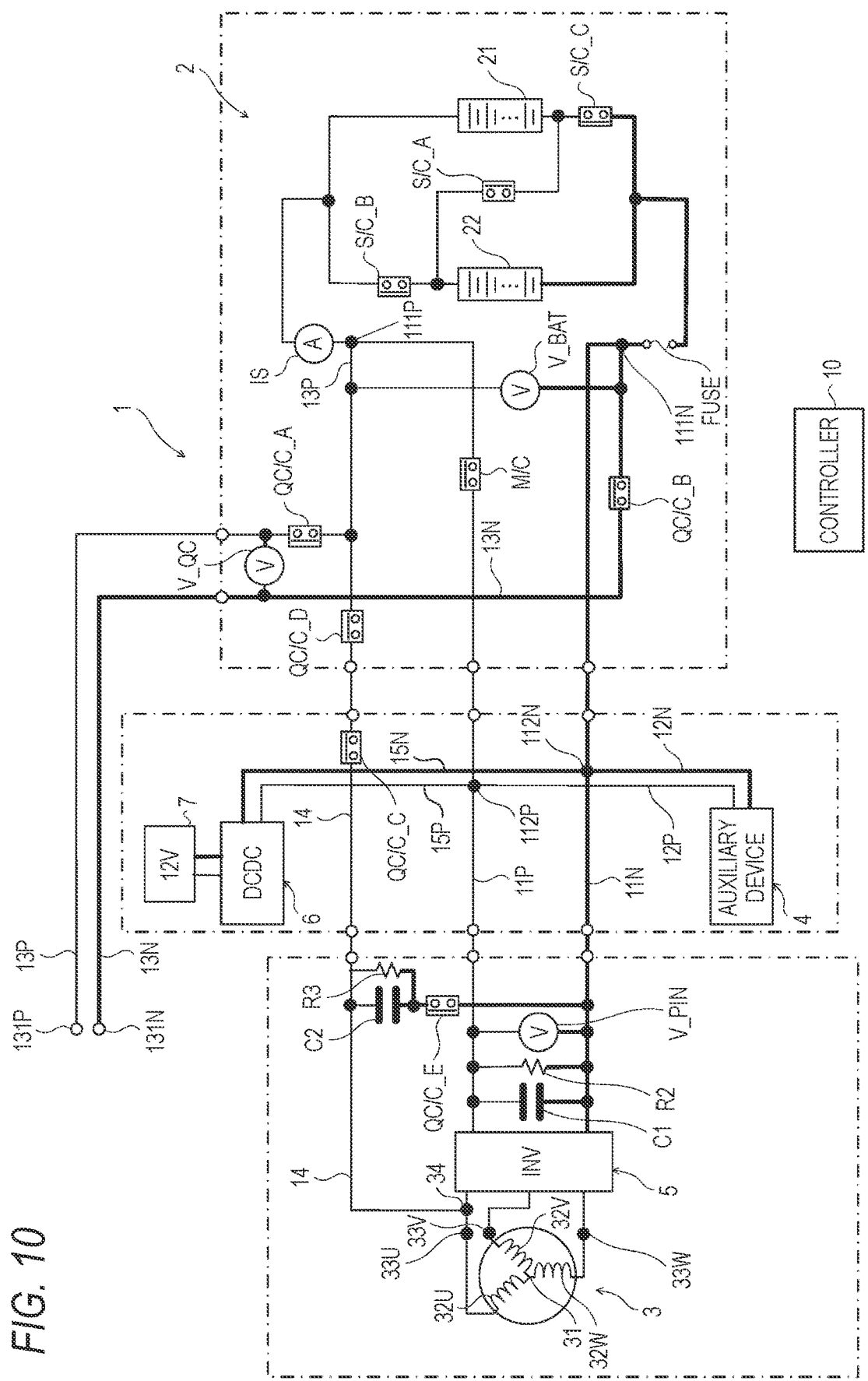
FIG. 10 is a diagram showing a configuration of an electric vehicle including the power storage system 1 according to a second embodiment.

In the power storage system 1 according to the first embodiment, the eighth contactor QC/C_A which is a main switch for charging is connected in series to the first contactor M/C which is the main switch of the first battery 2. However, in the power storage system 1 according to the second embodiment, the eighth contactor QC/C_A is connected in parallel to the first contactor M/C as shown in FIG. 10.

In the power storage system 1 according to the second embodiment, the same effect as those of the power storage system 1 according to the first embodiment can be obtained based on an operation according to an operation sequence to be described later. In the power storage system 1 according to the second embodiment, during charging at the second voltage (400 V), the first battery 2 charged at the second voltage (400 V) can be separated, by the first contactor M/C, from the first voltage (800 V) boosted by the three-phase motor 3 and the inverter 5, and thus no switch component corresponding to the seventh contactor VS/C in the first embodiment is required.

The second embodiment is similar to the first embodiment in that the second to fourth contactors S/C_A, S/C_B, and S/C_C constitute an example of the first switch unit and the tenth contactor QC/C_C is an example of the second switch unit, and is different from the first embodiment in that the first contactor M/C is an example of the third switch unit.

In the power storage system 1 according to the second embodiment, it is assumed that the eighth contactor QC/C_A, the ninth contactor QC/C_B, the second voltage sensor V_BAT, and the third voltage sensor V_QC are disposed in the first battery 2 and the branch circuit 14 is drawn out from inside the first battery 2. Therefore, the tenth contactor QC/C_C is provided in the first battery 2 in order to cut off connection with the outside of the battery when an abnormality occurs.

Next, an operation of the power storage system 1 according to the second embodiment will be described with reference to FIGS. 11 to 16.

Figure 11:
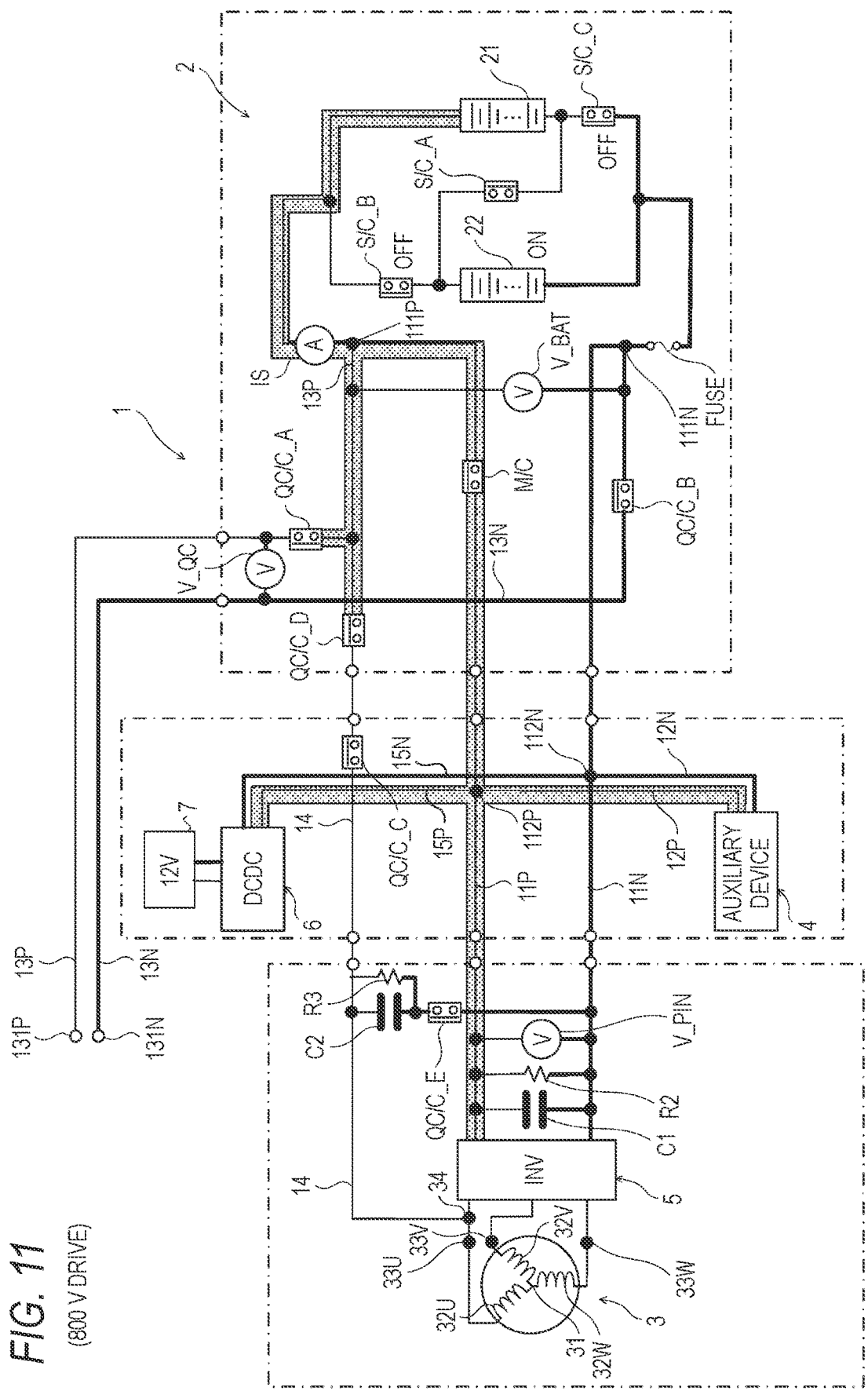
FIG. 11 is a diagram showing a flow of a current during traveling of the electric vehicle including the power storage system 1 according to the second embodiment.
Figure 14:
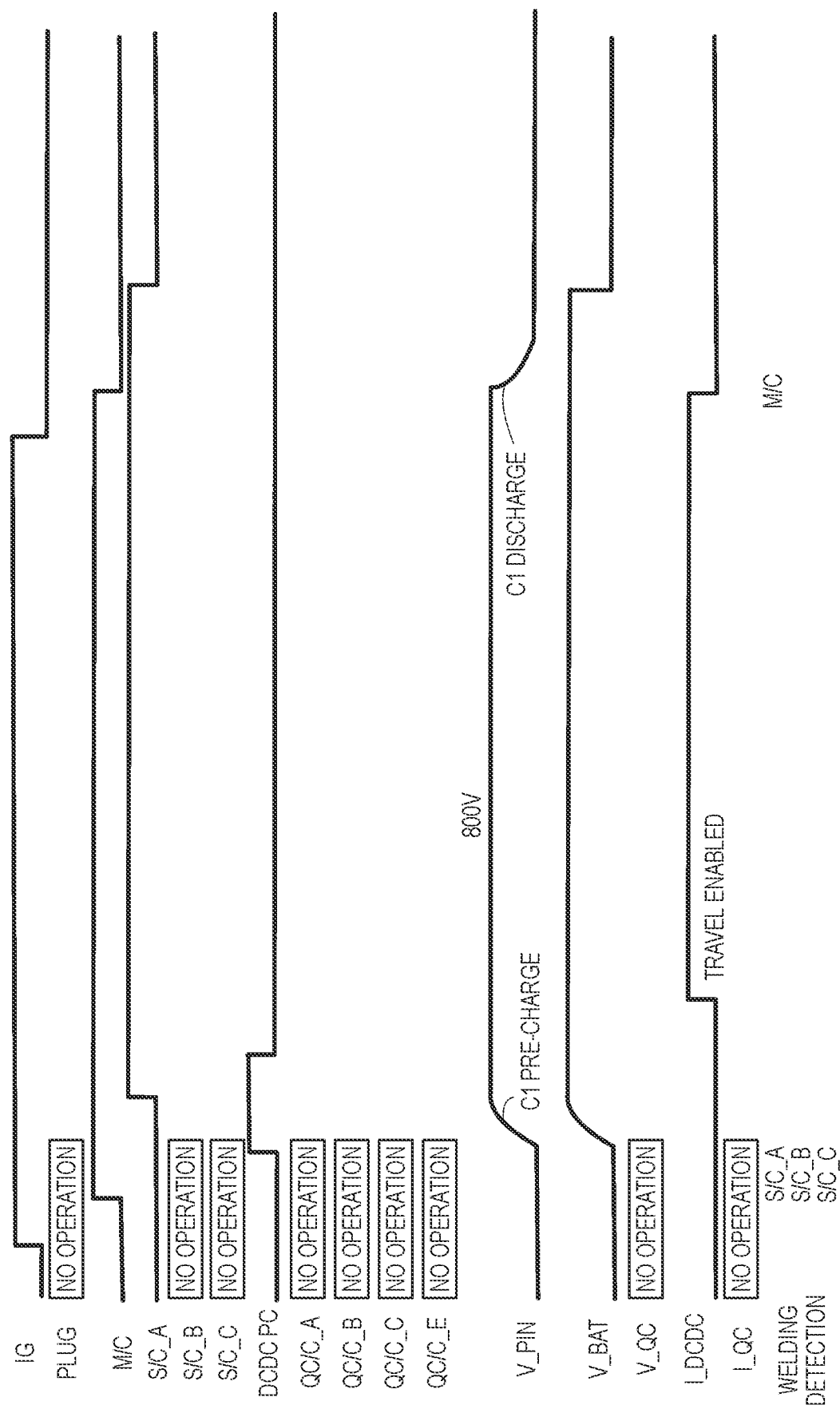
FIG. 14 is a diagram showing an operation sequence during traveling of the electric vehicle including the power storage system 1 according to the second embodiment.

FIG. 11 is a diagram showing a flow of a current during traveling (800 V drive) of the electric vehicle including the power storage system 1 according to the second embodiment, and FIG. 14 is a diagram showing an operation sequence during traveling (800 V drive) of the electric vehicle including the power storage system 1 according to the second embodiment.

When the ignition switch IG of the electric vehicle is turned on, the controller 10 first checks the detected voltage value of the second voltage sensor V_BAT. When the detected voltage value of the second voltage sensor V_BAT increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded, the controller 10 turns on the first contactor M/C, boosts the electric power of the second battery 7 to the first voltage (800 V) by a boost operation of the DC-DC converter 6 and pre-charges the first smoothing capacitor C1. When pre-charging of the first smoothing capacitor C1 is completed, the controller 10 turns on the second contactor S/C_A, connects the circuit in the first battery 2 to the first voltage state (800 V start-up), and afterward stops the boost operation of the DC-DC converter 6. Accordingly, travel of the electric vehicle is enabled. In this case, the auxiliary device 4 is connected to the electric power supply circuits 11P and 11N via the auxiliary device drive circuits 12P and 12N and is driven by the first voltage (800 V) supplied from the first battery 2.

On the other hand, when the ignition switch IG is turned off, the controller 10 first turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns off the second contactor S/C_A after discharging of the first smoothing capacitor C1 is completed, and ends the operation sequence during traveling.

Figure 12:
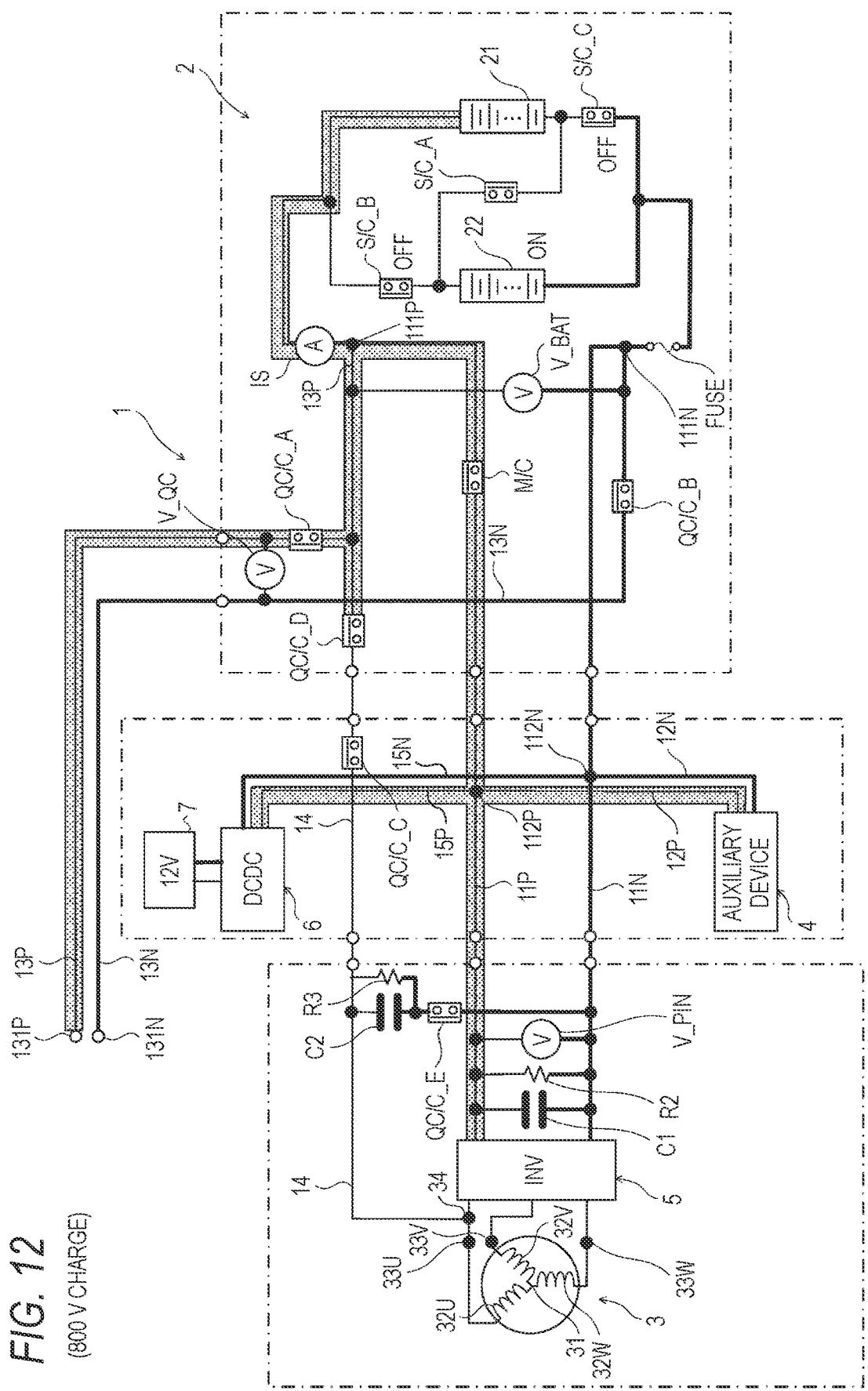
FIG. 12 is a diagram showing a flow of a current during charging at the first voltage (800 V) of the electric vehicle including the power storage system 1 according to the second embodiment.
Figure 15:
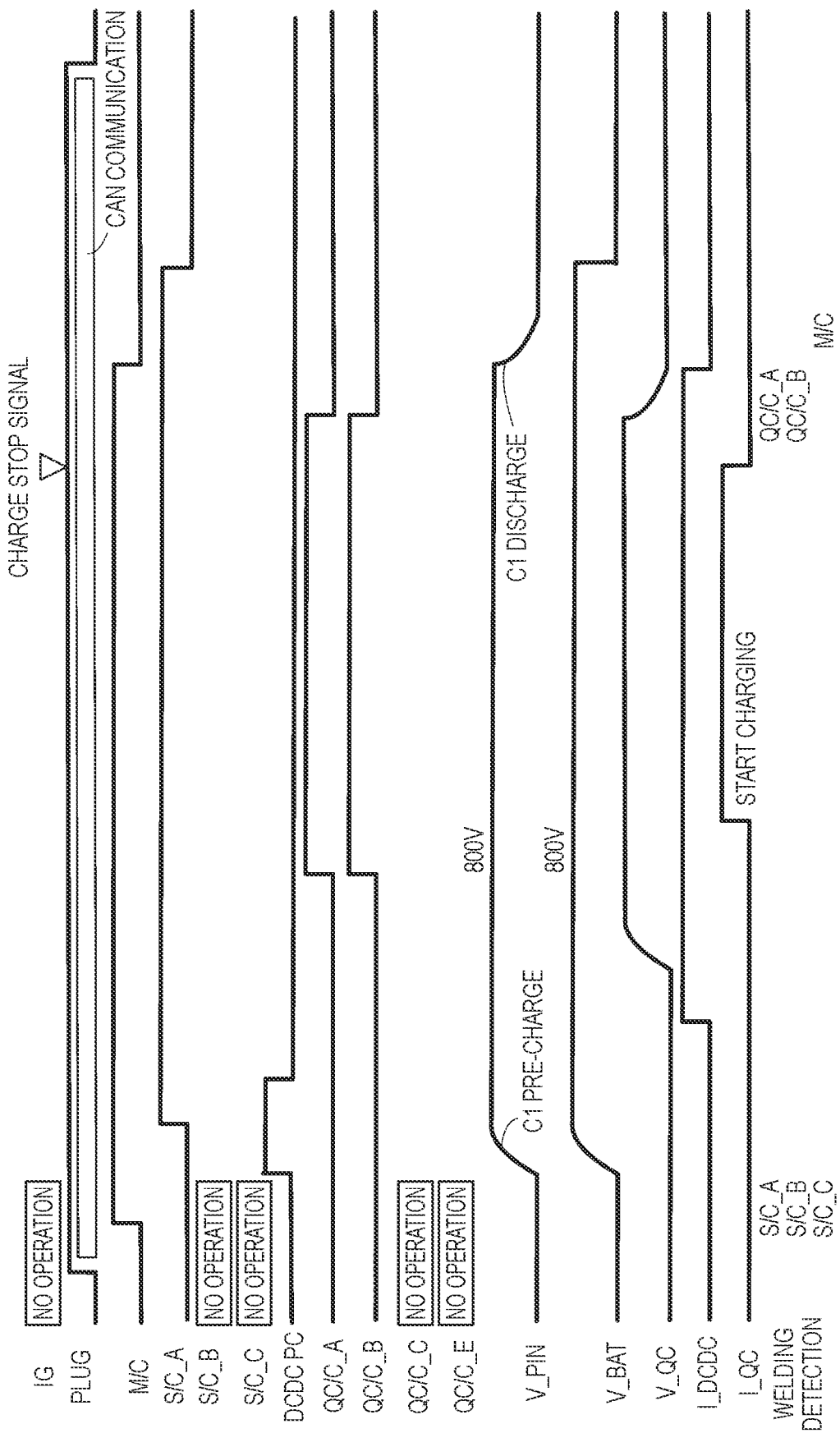
FIG. 15 is a diagram showing an operation sequence during charging at the first voltage (800 V) of the electric vehicle including the power storage system 1 according to the second embodiment.

FIG. 12 is a diagram showing a flow of a current during charging at the first voltage (800 V charge) of the electric vehicle including the power storage system 1 according to the second embodiment, and FIG. 15 is a diagram showing an operation sequence during charging at the first voltage (800 V charge) of the electric vehicle including the power storage system 1 according to the second embodiment.

When a charge plug is connected to the charge terminals 131P and 131N, the controller 10 performs CAN communication with the charging equipment to recognize a charge voltage, and checks the detected voltage value of the second voltage sensor V_BAT. When the detected voltage value of the second voltage sensor V_BAT increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded and the charge voltage is the first voltage (800 V), the controller 10 turns on the first contactor M/C. Then, the controller 10 boosts the electric power of the second battery 7 to the first voltage (800 V) by a boost operation of the DC-DC converter 6 to pre-charge the first smoothing capacitor C1. When pre-charging of the first smoothing capacitor C1 is completed, the controller 10 turns on the second contactor S/C_A, connects the circuit in the first battery 2 to the first voltage state (800 V start-up), and afterward stops the boost operation of the DC-DC converter 6. Accordingly, the first battery 2 is in a state in which charging at the first voltage (800 V) can be started.

Thereafter, the controller 10 turns on the eighth contactor QC/C_A and the ninth contactor QC/C_B to start charging the first battery 2 at the first voltage (800 V). In this case, the auxiliary device 4 is connected to the DC power supply circuits 13P and 13N via the auxiliary device drive circuits 12P and 12N, and is driven by the first voltage (800 V) supplied from the charging equipment.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns off the second contactor S/C_A after discharging of the first smoothing capacitor C1 is completed, and ends the operation sequence during charging at the first voltage (800 V).

Figure 13:
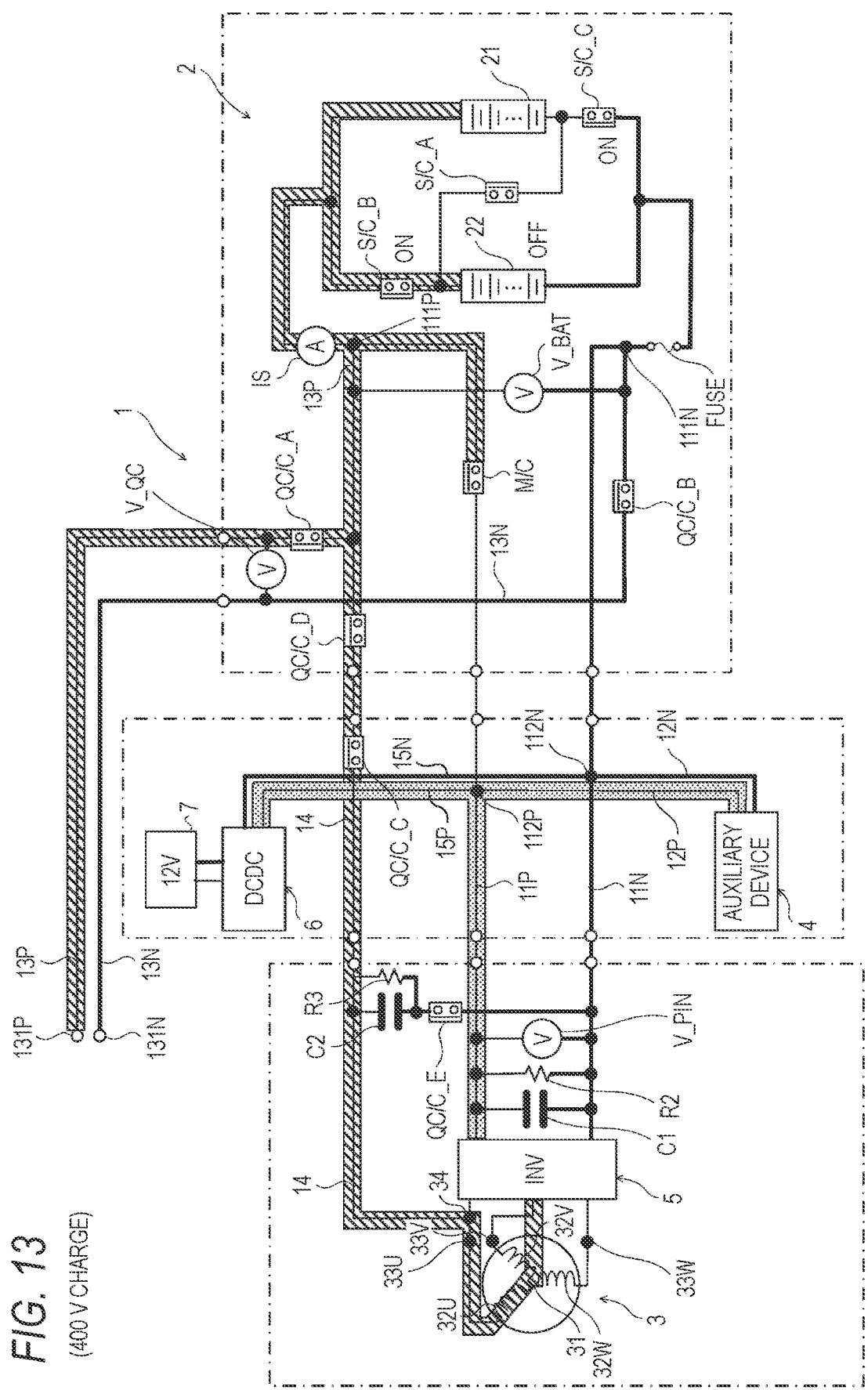
FIG. 13 is a diagram showing a flow of a current during charging at the second voltage (400 V) of the electric vehicle including the power storage system 1 according to the second embodiment.
Figure 16:
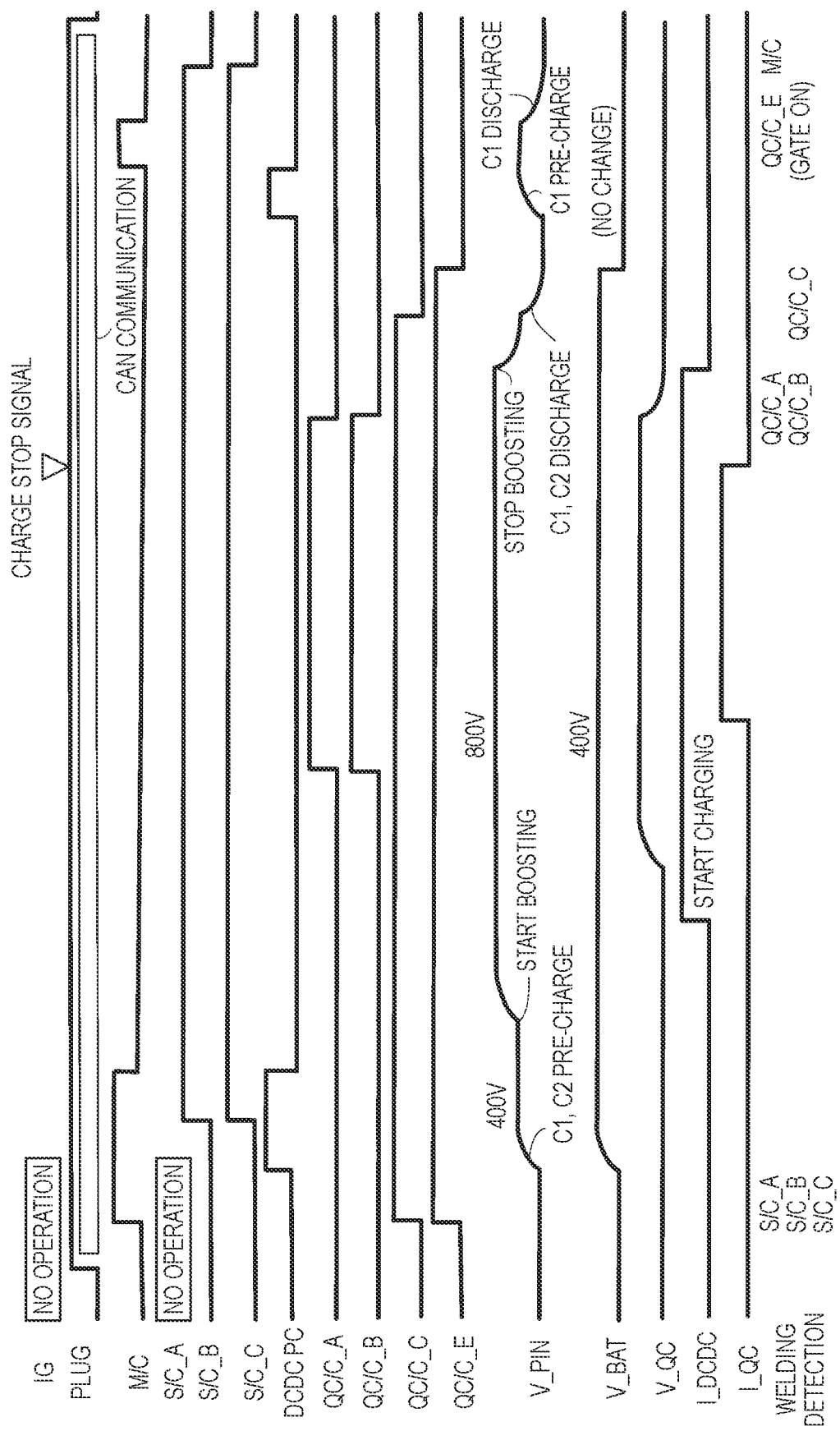
FIG. 16 is a diagram showing an operation sequence during charging at the second voltage (400 V) of the electric vehicle including the power storage system 1 according to the second embodiment.

FIG. 13 is a diagram showing a flow of a current during charging at the second voltage (400 V charge) of the electric vehicle including the power storage system 1 according to the second embodiment, and FIG. 16 is a diagram showing an operation sequence during charging at the second voltage (400 V charge) of the electric vehicle including the power storage system 1 according to the second embodiment.

When a charge plug is connected to the charge terminals 131P and 131N, the controller 10 performs CAN communication with the charging equipment to recognize a charge voltage, and checks the detected voltage value of the second voltage sensor V_BAT. When the detected voltage value of the second voltage sensor V_BAT increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded and the charge voltage is the second voltage (400 V), the controller 10 turns on the first contactor M/C, the tenth contactor QC/C_C, and the eleventh contactor QC/C_E, afterward boosts the electric power of the second battery 7 to the second voltage (400 V) by a boost operation of the DC-DC converter 6 and pre-charges the first smoothing capacitor C1 and the second smoothing capacitor C2. When pre-charging of the first smoothing capacitor C1 and the second smoothing capacitor C2 is completed, the controller 10 turns on the third contactor S/C_B and the fourth contactor S/C_C, connects the circuit in the first battery 2 in the second voltage state (400 V), afterward stops the boost operation of the DC-DC converter 6 and turns off the first contactor M/C. Thereafter, the controller 10 starts a boost operation by the three-phase motor 3 and the inverter 5. Accordingly, the first battery 2 is in a state in which charging at the second voltage (400 V) can be started.

Thereafter, the controller 10 turns on the eighth contactor QC/C_A and the ninth contactor QC/C_B to start charging the first battery 2 at the second voltage (400 V). In this case, the three-phase motor 3 and the inverter 5 connected to the DC power supply circuits 13P and 13N via the branch circuit 14 boost the second voltage (400 V) supplied from the charging equipment to the first voltage (800 V) to drive the auxiliary device 4.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 stops the boosting performed by the three-phase motor 3 and the inverter 5, then turns off the tenth contactor QC/C_C and checks the detected voltage value of the first voltage sensor V_PIN. When the detected voltage value of the first voltage sensor V_PIN does not decrease due to discharging of the first and second smoothing capacitors C1 and C2, the controller 10 determines that the tenth contactor QC/C_C is welded, and performs abnormality notification.

When the controller 10 determines that the tenth contactor QC/C_D is not welded, the controller 10 turns off the eleventh contactor QC/C_C after discharging of the first and second smoothing capacitors C1 and C2 is completed, afterward boosts the electric power of the second battery 7 to the second voltage (400 V) by a boost operation of the DC-DC converter 6 and pre-charges the first smoothing capacitor C1 again. When pre-charging of the first smoothing capacitor C1 is completed, the controller 10 stops the boost operation of the DC-DC converter 6, then turns on the first contactor M/C, turns on the gate of the inverter 5 and checks the detected voltage value of the first voltage sensor V_PIN. When the detected voltage value of the first voltage sensor V_PIN changes in response to the turn-on of the gate of the inverter 5, the controller 10 determines that the tenth contactor QC/C_C is welded, and performs abnormality notification.

When the controller 10 determines that the eleventh contactor QC/C_E is not welded, the controller 10 turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns off the third contactor S/C_B and the fourth contactor S/C_C and ends the operation sequence during charging at the second voltage (400 V).

Next, a first modification and a second modification of the power storage system 1 of the first embodiment will be described. Note that the same reference numerals as in the first embodiment are used for the same configurations as in the first embodiment, and description thereof will be omitted, and only changes will be described.

Figure 17:
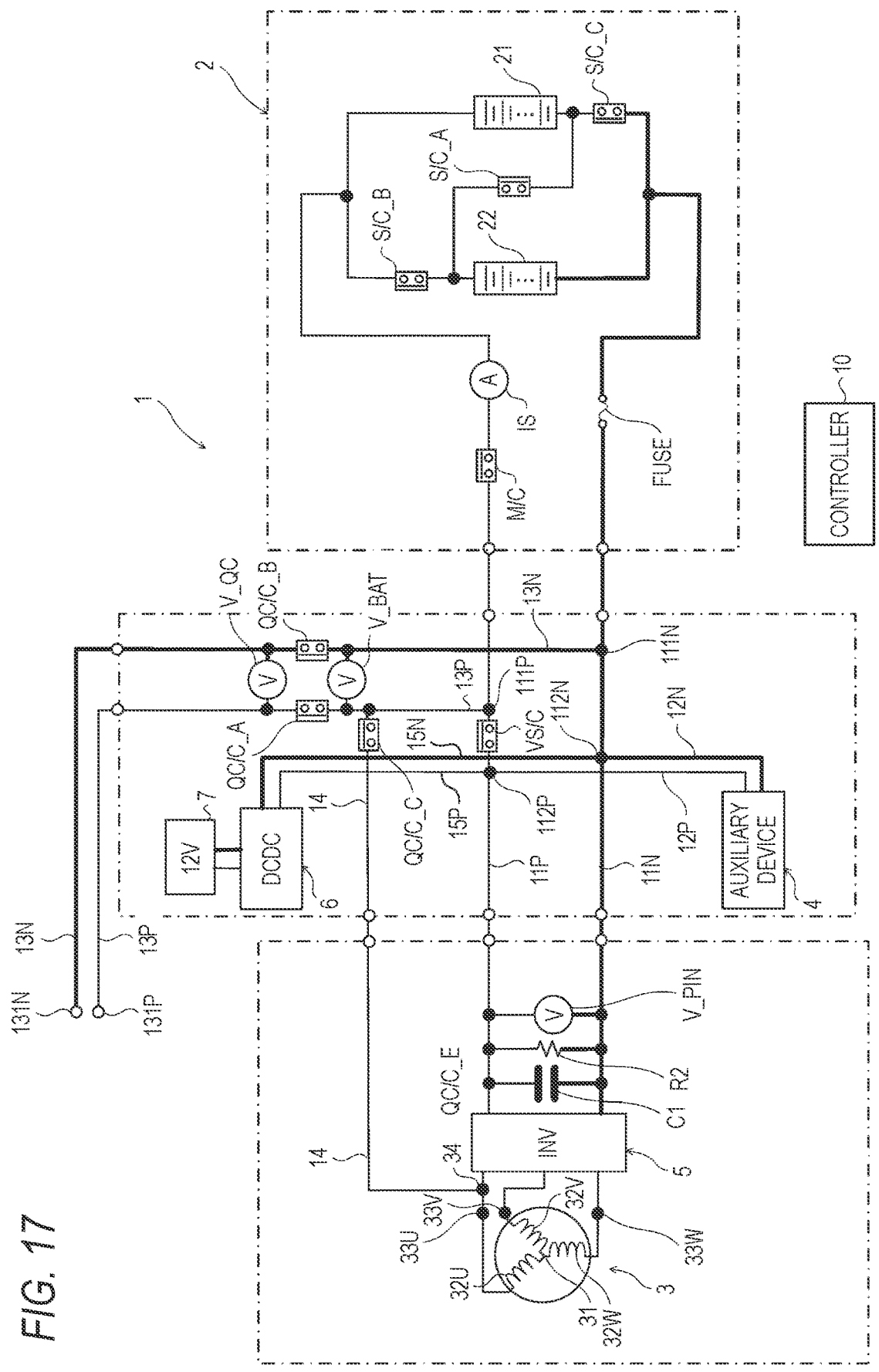
FIG. 17 is a diagram showing a configuration of a first modification of the power storage system 1 according to the first embodiment.

FIG. 17 is a diagram showing a configuration of the first modification of the power storage system 1 according to the first embodiment.

In the power storage system 1 of the first embodiment shown in FIG. 1, the eleventh contactor QC/C_E and the second smoothing capacitor C2 are provided in series on the circuit connecting the electric power supply circuit 11N on the negative side and the branch circuit 14, and the third resistor R3 is provided in parallel with the second smoothing capacitor C2. However, in the first modification of the power storage system 1 of the first embodiment shown in FIG. 17, the eleventh contactor QC/C_E, the second smoothing capacitor C2, and the third resistor R3 are not provided. Therefore, the number of components can be reduced, and the power storage system 1 can be made lighter. Layout of the power storage system 1 is also improved.

Figure 18:
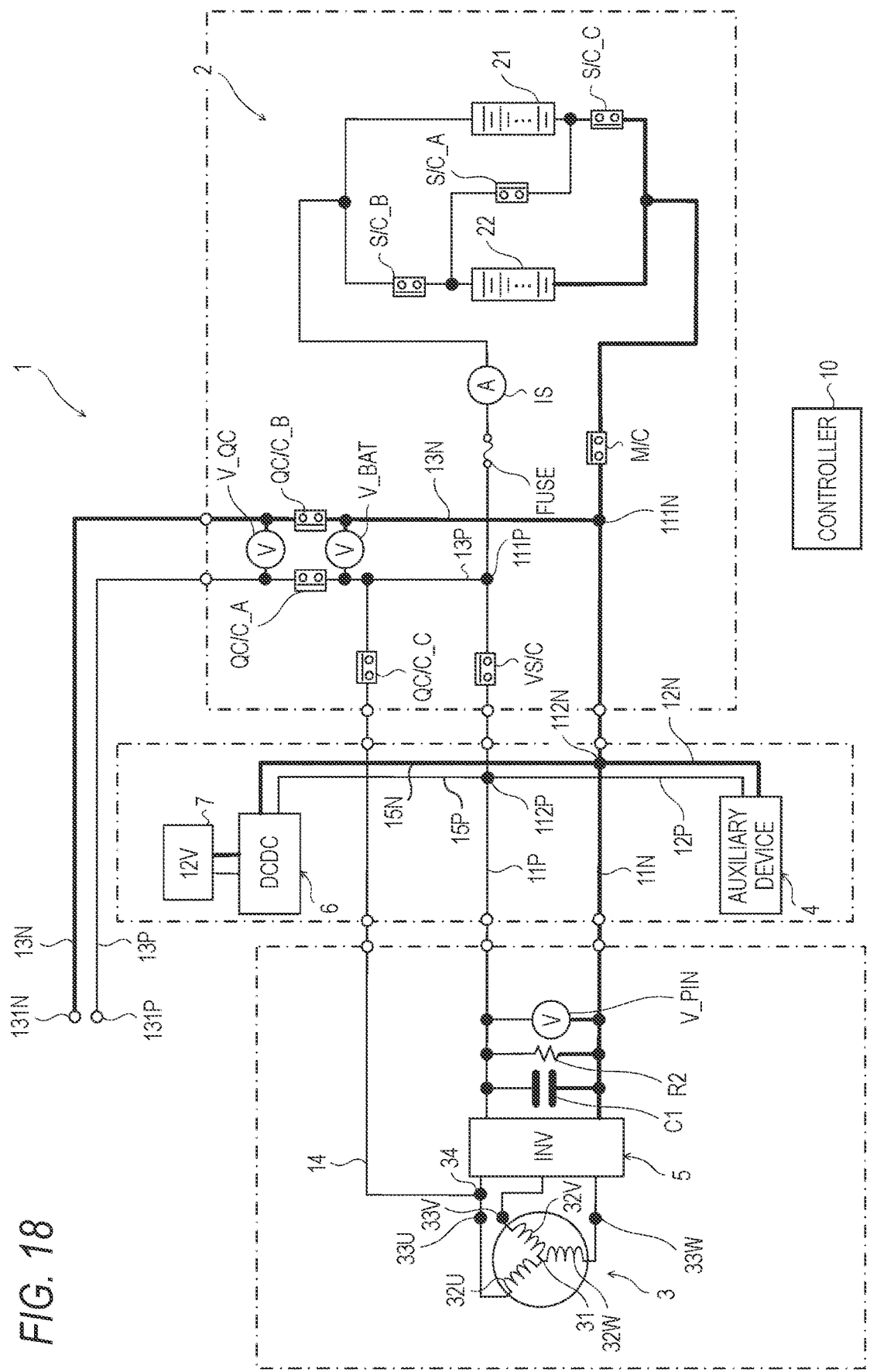
FIG. 18 is a diagram showing a configuration of a second modification of the power storage system 1 according to the first embodiment.

FIG. 18 is a diagram showing a configuration of the second modification of the power storage system 1 according to the first embodiment.

In addition to the matter that the eleventh contactor QC/C_E, the second smoothing capacitor C2, and the third resistor R3 are not provided, which is similar to the first modification, the second modification of the power storage system 1 of the first embodiment shown in FIG. 18 differs from the power storage system 1 of the first embodiment shown in FIG. 1 also in the following points.

In the power storage system 1 of the first embodiment shown in FIG. 1, the first contactor M/C is provided on the positive end portion of the battery 2, and the current breaker FUSE is provided on the negative end portion of the battery 2. However, in the present modification, as shown in FIG. 18, the first contactor M/C is provided on the negative side of the battery 2, and the current breaker FUSE is provided on the positive side of the battery 2. Furthermore, as a configuration of the battery 2, the seventh contactor VS/C, the eighth contactor QC/C_A, the ninth contactor QC/C_B, the tenth contactor QC/C_C, the third voltage sensor V_QC, and the second voltage sensor V_BAT are provided closer to the end portion side than the first contactor M/C and the current breaker FUSE.

In the power storage system 1 of the first embodiment shown in FIG. 1, when the power of the battery 2 is cut off such as when the battery 2 fails, in other words, when the electric power supply to the outside of the battery 2 is cut off, it is necessary to turn off the first contactor M/C provided at the positive end portion of the battery 2 and to cut off the current breaker FUSE provided at the negative end portion of the battery 2. Once the current breaker FUSE is cut, replacement is necessary.

In the present modification, when cutting off the power of the battery 2, the seventh contactor VS/C and the eighth contactor QC/C_A, which are provided on the positive side of the battery 2 and closer to the end portion side than the current breaker FUSE, are turned off, and the first contactor M/C provided on the negative side of the battery 2 is turned off, so that the power of the battery 2 can be cut off without cutting off the current breaker FUSE. In this way, according to the present modification, the power of the battery 2 can be cut off only by ON/OFF control of the contactors, and therefore, control can be simplified and replacement of the current breaker FUSE can be made unnecessary.

Next, a modification of the power storage system 1 of the second embodiment will be described. Note that the same reference numerals as in the second embodiment are used for the same configurations as in the second embodiment, and description thereof will be omitted, and only changes will be described.

Figure 19:
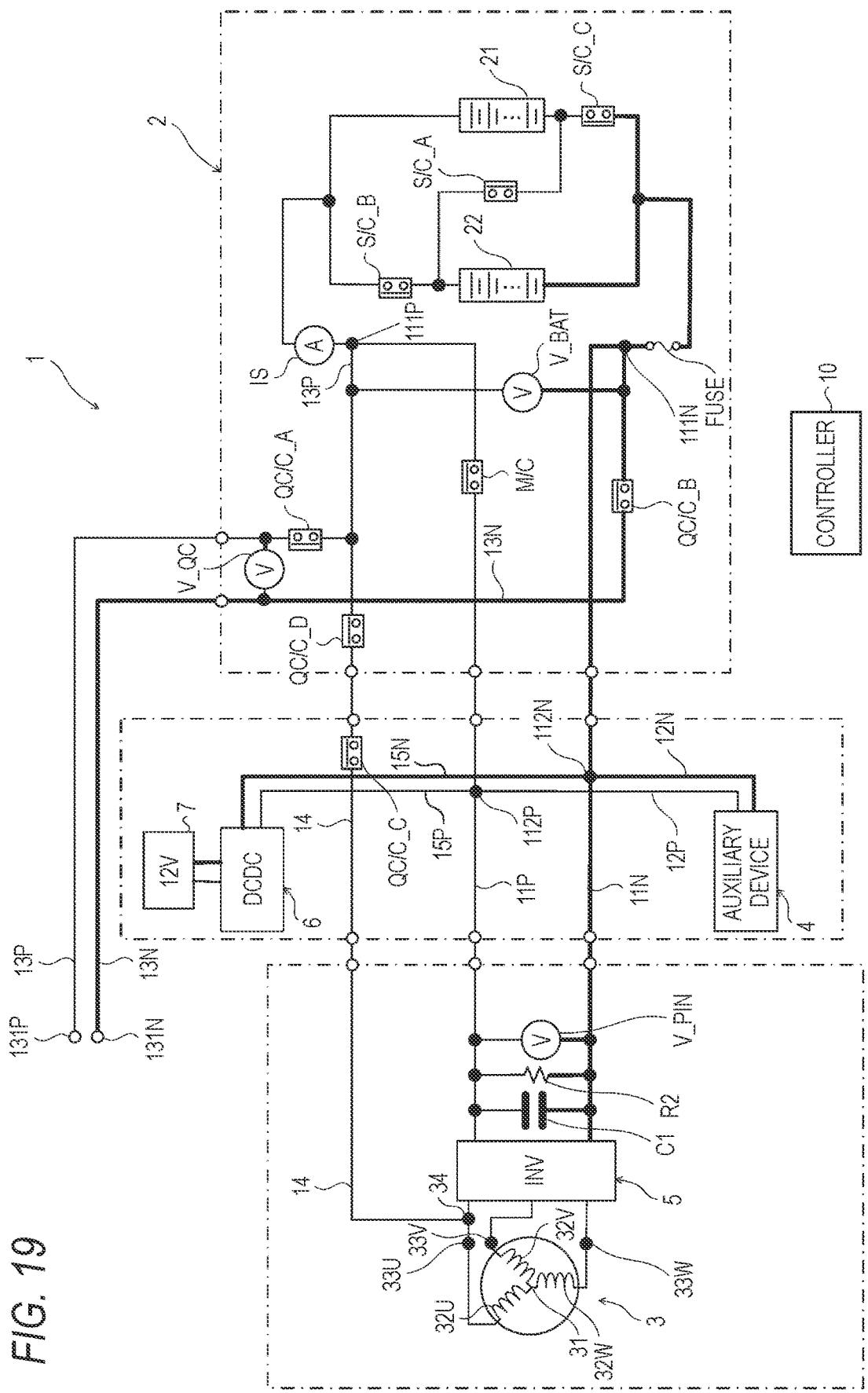
FIG. 19 is a diagram showing a configuration of a modification of the power storage system 1 according to the second embodiment.

FIG. 19 is a diagram showing a configuration of the modification of the power storage system 1 according to the second embodiment.

In the power storage system 1 of the second embodiment shown in FIG. 10, the eleventh contactor QC/C_E and the second smoothing capacitor C2 are provided in series on the circuit connecting the electric power supply circuit 11N on the negative side and the branch circuit 14, and the third resistor R3 is provided in parallel with the second smoothing capacitor C2. However, in the modification of the power storage system 1 of the second embodiment shown in FIG. 19, the eleventh contactor QC/C_E, the second smoothing capacitor C2, and the third resistor R3 are not provided. Therefore, the number of components can be reduced, and the power storage system 1 can be made lighter. Layout of the power storage system 1 is also improved.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiment may be freely combined without departing from the gist of the invention.

For example, in the above embodiment, the controller 10 performs CAN communication with the charging equipment, but the communication method is not limited to CAN communication, and any communication method can be adopted.

In the present description, at least the following matters are described. Although corresponding constituent elements or the like in the above-described embodiments are shown in parentheses, the present invention is not limited thereto.

(1) A power storage system, including:

a first battery (first battery 2) including a first power storage (first power storage 21), a second power storage (second power storage 22), and a first switch unit (second contactor S/C_A, third contactor S/C_B, and fourth contactor S/C_C) configured to switch between a first voltage state in which the first power storage and the second power storage are connected in series and chargeable at a first voltage (800 V), and a second voltage state in which the first power storage and the second power storage are connected in parallel and chargeable at a second voltage (400 V);

a three-phase motor (three-phase motor 3) including coils of three phases (coils 32U, 32V, and 32W) connected at a neutral point (neutral point 31), the three-phase motor being configured to be driven by electric power supplied from the first battery;

an inverter (inverter 5) connected on an electric power transmission path (electric power supply circuits 11P and 11N) between the first battery and the three-phase motor;

a DC power supply circuit (DC power supply circuits 13P and 13N) connected to a first connection portion (connection portions 111P and 111N) positioned on an electric power transmission path between the inverter and the first battery;

a branch circuit (branch circuit 14) branched from the DC power supply circuit on a positive electrode side of the DC power supply circuit, and connected to a coil of any one phase among the coils of three phases.

a capacitor (first smoothing capacitor C1 and second smoothing capacitor C2) having one end and an other end, the one end being connected to an electric power supply circuit, which connects the inverter and the first battery, at a negative electrode side (electric power supply circuit 11N on negative electrode side), and the other end being connected to the branch circuit or the electric power supply circuit at a positive electrode side (electric power supply circuit 11P on positive electrode side);

a pre-charge circuit (converter circuits 15P and 15N) connected, between the inverter and the first connection portion of the DC power supply circuit, to an electric power transmission path between the inverter and the first battery;

a converter (DC-DC converter 6) connected to the pre-charge circuit; and a second battery (second battery 7) connected to the converter and having a voltage lower than the first voltage and the second voltage.

According to (1), it is possible to appropriately perform charging according to a voltage state of charging equipment by switching, by the first switch unit, a mode of connection between the first power storage and the second power storage both in a system in which the external charging equipment performs charging at the first voltage or a system in which the external charging equipment performs charging at the second voltage. That is, charging can be performed without passing through any voltage converter during charging, efficiency deterioration due to a voltage converter can be avoided, and it is possible to eliminate a voltage converter for charging.

Since the DC power supply circuit on the positive electrode side connected to the first connection portion positioned on the electric power transmission path between the inverter and the battery includes the branch circuit connected to the coil of any one phase among the three-phase motor, voltage conversion can be performed using the three-phase motor and the inverter. Accordingly, even when the voltage state of the charging equipment is different from an operating voltage of an auxiliary device or the like, it is possible to eliminate a dedicated voltage converter, and thus a manufacturing cost can be reduced.

Further, the capacitor can be pre-charged with electric power of the second battery.

(2) The power storage system according to (1),
in which the converter is a bidirectional converter.

According to (2), the capacitor can be pre-charged with the electric power of the second battery, and the second battery can be charged with the electric power of the first battery.

(3) The power storage system according to (1),
in which the capacitor includes:
a first capacitor (first smoothing capacitor C1) having one end connected to the electric power supply circuit at the negative electrode side, and an other end connected to the electric power supply circuit at the positive electrode side; and
a second capacitor (second smoothing capacitor C2) having one end connected to the electric power supply circuit at the negative electrode side, and an other end connected to the branch circuit.

According to (3), an inrush current can be inhibited both in the first voltage state and in the second voltage state. In addition, both in the first voltage state and in the second voltage state, the capacitor can be pre-charged by the converter with the electric power of the second battery.

(4) The power storage system according to (1), further including:
a controller (controller 10) configured to control the first switch unit, the inverter, and the converter,
in which the controller is configured to switch the first switch unit and change a boost voltage of the converter, according to a charge voltage of the DC power supply circuit.

According to (4), a voltage can be adjusted to an appropriate voltage by the converter according to the charge voltage of the DC power supply circuit.

(5) The power storage system according to (4),
in which in a case where the charge voltage of the DC power supply circuit is the first voltage, the controller is configured to set the boost voltage of the converter to the first voltage, pre-charge the capacitor by the pre-charge circuit, and afterward control the first switch unit to switch the first battery to the first voltage state, and
in a case where the charge voltage of the DC power supply circuit is the second voltage, the controller is configured to set the boost voltage of the converter to the second voltage, pre-charge the capacitor by the pre-charge circuit, and afterward control the first switch unit to switch the first battery to the second voltage state.

According to (5), the voltage can be adjusted to an appropriate voltage by the converter according to the charge voltage of the DC power supply circuit, and the capacitor can be pre-charged.

(6) The power storage system according to (1),
in which the branch circuit is connected to a coil of any one phase among the coils of three phases at a second connection portion (connection terminal 34) via a second switch unit (tenth contactor QC/C_C).

According to (6), when the three-phase motor does not perform voltage conversion, that is, when the coils of the three-phase motor are not used as transformers, a connection to the coil of the branch circuit can be cut off.

(7) The power storage system according to (6),
in which the branch circuit is connected to an electric power transmission path (electric power supply circuit 11N) between the inverter and the first battery at a negative electrode side via a fourth switch unit (eleventh contactor QC/C_E) and a capacitor (second smoothing capacitor C2).

According to (7), it is possible to perform failure detection of the second switch unit.

(8) The power storage system according to any one of (1) to (7), further including:
an auxiliary device (auxiliary device 4) configured to be driven by DC electric power from the second battery and an external power supply; and
an auxiliary device drive circuit (auxiliary device drive circuits 12P and 12N) connected on an electric power transmission path between the inverter and the first connection portion, and configured to supply electric power to the auxiliary device,
in which the auxiliary device is operated at the first voltage.

According to (8), it is unnecessary to perform voltage conversion during traveling and during charging at the first voltage.

(9) The power storage system according to (8), further including:
a controller (controller 10) configured to control the first switch unit, the inverter, and the converter,
in which in a case where the charge voltage of the DC power supply circuit is the second voltage, the controller is configured to cause the inverter to boost a voltage supplied from the branch circuit to the three-phase motor to the first voltage after pre-charging.

According to (9), since voltage conversion can be performed using the three-phase motor and the inverter, it is possible to eliminate an auxiliary device voltage converter.

(10) The power storage system according to (8),
in which the auxiliary device is connected to the first battery via a third switch unit (seventh contactor VS/C in first embodiment and first contactor M/C in second embodiment).

According to (10), when voltage conversion is performed by the three-phase motor, that is, when the coils of the three-phase motor are used as transformers, the third switch unit can separate a portion in the first voltage from a portion in the second voltage.

What is claimed is:
1. A power storage system, comprising:
a first battery including a first power storage, a second power storage, and a first switch unit configured to switch between a first voltage state in which the first power storage and the second power storage are connected in series and chargeable at a first voltage, and a second voltage state in which the first power storage and the second power storage are connected in parallel and chargeable at a second voltage;
a three-phase motor including coils of three phases connected at a neutral point, the three-phase motor being configured to be driven by electric power supplied from the first battery;
an inverter connected on an electric power transmission path between the first battery and the three-phase motor;

a DC power supply circuit connected to a first connection portion positioned on an electric power transmission path between the inverter and the first battery;

a branch circuit branched from the DC power supply circuit on a positive electrode side of the DC power supply circuit, and connected to a coil of any one phase among the coils of three phases;

a capacitor having one end and an other end, the one end being connected to an electric power supply circuit, which connects the inverter and the first battery, at a negative electrode side, and the other end being connected to the branch circuit or the electric power supply circuit at a positive electrode side;

a pre-charge circuit connected, between the inverter and the first connection portion of the DC power supply circuit, to an electric power transmission path between the inverter and the first battery;

a converter connected to the pre-charge circuit; and a second battery connected to the converter and having a voltage lower than the first voltage and the second voltage.

2. The power storage system according to claim 1, wherein the converter is a bidirectional converter.

3. The power storage system according to claim 1, wherein the capacitor includes:
   a first capacitor having one end connected to the electric power supply circuit at the negative electrode side, and an other end connected to the electric power supply circuit at the positive electrode side; and
   a second capacitor having one end connected to the electric power supply circuit at the negative electrode side, and an other end connected to the branch circuit.

4. The power storage system according to claim 1, further comprising:
   a controller configured to control the first switch unit, the inverter, and the converter,
   wherein the controller is configured to switch the first switch unit and change a boost voltage of the converter, according to a charge voltage of the DC power supply circuit.

5. The power storage system according to claim 4, wherein in a case where the charge voltage of the DC power supply circuit is the first voltage, the controller is configured to set the boost voltage of the converter to the first voltage, pre-charge the capacitor by the pre-charge circuit, and afterward control the first switch unit to switch the first battery to the first voltage state, and in a case where the charge voltage of the DC power supply circuit is the second voltage, the controller is configured to set the boost voltage of the converter to the second voltage, pre-charge the capacitor by the pre-charge circuit, and afterward control the first switch unit to switch the first battery to the second voltage state.

6. The power storage system according to claim 1, wherein the branch circuit is connected to a coil of any one phase among the coils of three phases at a second connection portion via a second switch unit.

7. The power storage system according to claim 6, wherein the branch circuit is connected to an electric power transmission path between the inverter and the first battery at a negative electrode side via a fourth switch unit and a capacitor.

8. The power storage system according to claim 1, further comprising:
   an auxiliary device configured to be driven by DC electric power from the second battery and an external power supply; and
   an auxiliary device drive circuit connected on an electric power transmission path between the inverter and the first connection portion, and configured to supply electric power to the auxiliary device,
   wherein the auxiliary device is operated at the first voltage.

9. The power storage system according to claim 8, further comprising:
   a controller configured to control the first switch unit, the inverter, and the converter,
   wherein in a case where the charge voltage of the DC power supply circuit is the second voltage, the controller is configured to cause the inverter to boost a voltage supplied from the branch circuit to the three-phase motor to the first voltage after pre-charging.

10. The power storage system according to claim 8, wherein the auxiliary device is connected to the first battery via a third switch unit.

* * * * *